United States Patent
Hiroi et al.

(10) Patent No.: US 7,895,911 B2
(45) Date of Patent: Mar. 1, 2011

(54) SHIFT CONTROL DEVICE FOR A VEHICLE

(75) Inventors: Kazutaka Hiroi, Shizuoka-ken (JP);
Yasuhiro Takahashi, Tokyo (JP)

(73) Assignees: Yamaha Hatsudoki Kabushiki Kaisha, Shizuoka (JP); Mitsubishi Electric Corporation, Tokyo (JP)

( * ) Notice: Subject to any disclaimer, the term of this patent is extended or adjusted under 35 U.S.C. 154(b) by 601 days.

(21) Appl. No.: 11/923,931

(22) Filed: Oct. 25, 2007

(65) Prior Publication Data

US 2008/0098837 A1  May 1, 2008

(30) Foreign Application Priority Data

Oct. 27, 2006 (JP) ............................. 2006-292899

(51) Int. Cl.
*F16H 59/00* (2006.01)
*F16H 61/00* (2006.01)
*F16H 63/00* (2006.01)

(52) U.S. Cl. .................. 74/335; 74/336 R; 74/337.5
(58) Field of Classification Search .................. 74/335, 74/336 R, 337, 337.5
See application file for complete search history.

(56) References Cited

U.S. PATENT DOCUMENTS

| 6,095,004 A * | 8/2000 | Ota et al. .................. 74/336 R |
| 6,249,734 B1 * | 6/2001 | Ota .............................. 701/51 |
| 6,484,597 B2 * | 11/2002 | Ota et al. ....................... 74/335 |
| 7,367,923 B2 * | 5/2008 | Zenno et al. ................. 477/180 |
| 2008/0035410 A1 * | 2/2008 | Kosugi et al. ............... 180/383 |

FOREIGN PATENT DOCUMENTS

JP  2000-027991  1/2000

* cited by examiner

*Primary Examiner*—Tisha D Lewis
(74) *Attorney, Agent, or Firm*—Keating & Bennett, LLP

(57) ABSTRACT

A shift control device in which a number of times that an angle change amount per a defined time period is successively equal to or less than a determined value is calculated, when a rotation angle of a shift shaft is equal to or more than a threshold value. In addition, an abutting state determination is performed that determines whether the number of times is equal to or above a threshold value, and if it is determined that there is an abutting state (namely, the shift shaft has reached an actual mechanical maximum rotation angle), processing shifts to an engagement process of a shift clutch.

20 Claims, 15 Drawing Sheets

SHIFT CONTROL DEVICE FOR A VEHICLE

RELATED APPLICATIONS

This application is related to, and claims priority from, Japanese Patent Application No. 2006-292899, filed Oct. 27, 2006, the entirety of which is hereby incorporated by reference herein and made a part of the present specification.

BACKGROUND OF THE INVENTION

1. Field of the Invention

The present invention generally relates to a shift control device that performs a clutch operation and a shift operation using a drive of an actuator, such as a motor, and a vehicle provided with such a shift control device.

2. Description of the Related Art

Shift control devices are known in which engagement and disengagement of a clutch or switching of a speed gear is performed based on interlock with rotation of a shift shaft that is caused to rotate by a drive force of a motor. For example, Japanese Publication No. 2000-27991 illustrates such a shift control device.

In addition, in Japanese Publication No. 2000-27991, a method for correcting a neutral position of the shift shaft is disclosed. More specifically, respective rotation angles when the shift shaft has rotated to a maximum rotation angle in the normal rotation direction or the reverse rotation direction are detected, and the neutral position of the shift shaft is determined to be the intermediate position between these rotation angles. Then, the neutral position is updated and recorded.

SUMMARY OF THE INVENTION

An aspect of the present invention is the realization by the present inventors that the setting method for the neutral position disclosed in Japanese Publication No. 2000-27991 has the problem that, when a number of vehicles are manufactured, there are occasions when design error of structural components, assembly error and the like can cause each vehicle to have different mechanical maximum rotation angles in the normal rotation direction and the reverse rotation direction of the shift shaft. If the maximum rotation angles in the normal rotation direction and the reverse rotation direction are different, when the neutral position is calculated based on the detected rotation angles, the calculated neutral position is different from the actual neutral position. If a neutral position that has been miscalculated in this way is used as a reference value, there are occasions when the gear change shift operation will not be accurate.

Certain preferred embodiments of the present invention have been devised in light of the above-described circumstances, and it is an object thereof to provide a shift control device that can perform gear change shift reliably even when design or assembly error (including normal manufacturing variations) exist.

A preferred embodiment involves a shift control device that includes a clutch, a speed change device having a plurality of speed gear ratios, an actuator, a shift shaft that is rotated by a driving force of the actuator, a clutch transmission mechanism that engages and disengages the clutch in response to rotation of the shift shaft, a speed change device transmission mechanism that switches the speed gear ratio in response to rotation of the shift shaft, and a control device that controls a drive of the actuator, the shift control device further includes a stopper that directly or indirectly regulates rotation of the shift shaft such that a rotation angle of the shift shaft does not exceed a defined mechanical maximum rotation angle; and a first determination device that performs an abutting state determination that determines whether the rotation angle of the shift shaft has reached the mechanical maximum rotation angle.

Another preferred embodiment is a shift control device as described above, wherein an abutting state determination is performed that determines whether the rotation angle of the shift shaft has reached the mechanical maximum rotation angle. As a result, a configuration can be adopted in which, during the clutch disengagement process performed during gear change shift, the control device waits until the abutting state determination is satisfied before initiating the clutch engagement process. Accordingly, the gear change shift can be performed once the clutch is definitely disengaged. As a result of adopting such a configuration, even if the above-described mechanical maximum rotation angle is different for different vehicles due to design error, assembly error and the like (including normal manufacturing variations) of structural members, gear change shift can be performed reliably.

According to the preferred embodiments of the invention a gear change shift can be performed reliably even when design error or assembly error exists, including normal manufacturing variations.

BRIEF DESCRIPTION OF THE DRAWINGS

These and other features, aspects and advantages of the present invention are described with reference to drawings of preferred embodiments, which are intended to illustrate, but not to limit, the present invention. The drawings contain fifteen (15) figures.

DETAILED DESCRIPTION OF THE PREFERRED EMBODIMENTS

Several preferred embodiments of the present invention are described below with reference to the drawings.

First Embodiment

Figure 1:
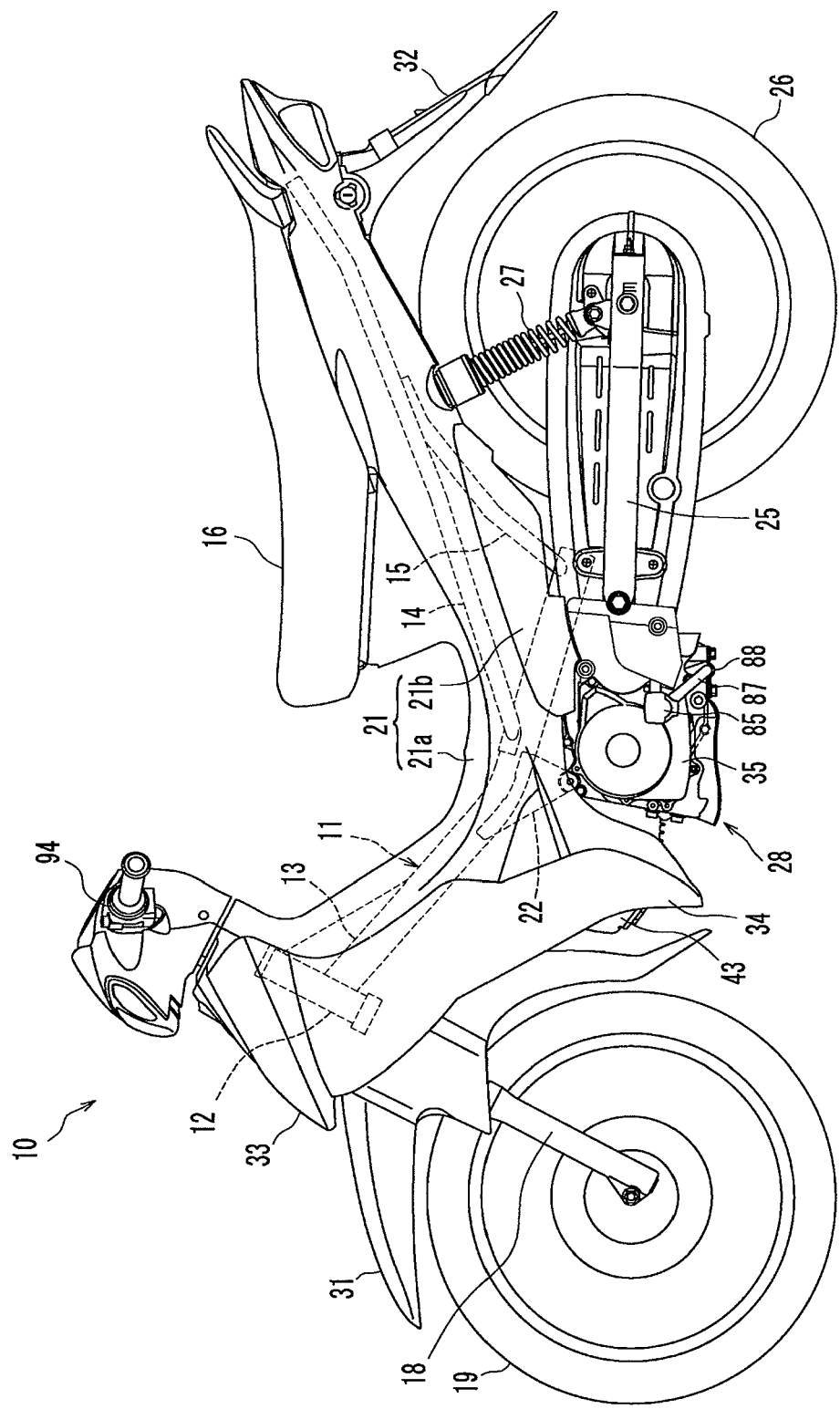
FIG. 1 is a left side view of a motorcycle having certain features, aspects and advantages of the present invention.

FIG. 1 shows a motorcycle 10 according to a first embodiment. The motorcycle 10 includes a body frame 11 that forms a frame, and a seat 16 on which a rider sits. The illustrated motorcycle 10 is a moped-type motorcycle. However, the term "moped-type" as used here merely indicates the type of the vehicle's shape, and is not intended to either limit the maximum speed, the displacement or the like of the vehicle, or the size of the vehicle or the like. In addition, the straddle-type vehicle according to the invention is not limited to being a moped-type motorcycle. Accordingly, the invention may be applied to types of motorcycles in which a fuel tank is disposed in front of a seat, and thus may be applied to any straddle-type vehicle, such as a three-wheeled motor vehicle or an ATV. In addition, the invention is not limited to being used in straddle-type vehicles, and may be applied to other vehicles such as a two person buggy or the like.

In the following description, the directions front and rear, and left and right indicate the front and rear and the left and right directions when viewed from a rider seated on the seat 16. The body frame 11 includes a steering head pipe 12, a single main frame 13 that extends diagonally downwards to the rear from the steering head pipe 12, a left and right pair of seat rails 14 that extend diagonally upward to the rear from a central section of the main frame 13, and a left and right pair of rear stays 15 that extend diagonally upward to the rear from the main frame 13 from a point further to the rear side from the seat rails 14. The rear stays 15 are connected to a rear end section of the main frame 13 and a central section of the seat rails 14. A front wheel 19 is connected to the steering head pipe 12 via a front fork 18.

An upper side and the left and right sides of the body frame 11 are mainly covered by a main cover 21a and side covers 21b. Hereinafter, the main cover 21a and the side covers 21b are referred to together as a body cover 21.

A left and right pair of engine brackets 22 protrudes downwardly from a central section of the main frame 13.

In addition, a rear arm 25 is swingably supported by a body frame rear lower section. A rear wheel 26 is supported by a rear end section of the rear arm 25. A rear end portion of the rear arm 25 is coupled to the body frame 11 via a cushion unit, or shock absorber 27.

The motorcycle 10 is provided with a front fender 31 that is positioned above and to the rear of the front wheel 19, a rear fender 32 that is positioned above the upper side of the rear wheel 26 at a position diagonally upwards to the rear from the rear wheel 26. In addition, the motorcycle 10 includes, in addition to the above-described body cover 21, a front cowl 33, and left and right leg shields 34.

An engine unit 28 that drives the rear wheel 26 is supported by the body frame 11. The engine unit 28 is provided with a crank case 35 and a cylinder 43 that extends forward or diagonally upward from the crank case 35.

Foot rests 85 are disposed to the left and right sides of the engine unit 28. The left and right foot rests 85 are supported by the crank case 35 via connection shafts 87 and attachment plates 88 fixed to the connection shafts 87.

The structure of the engine unit 28 is described with reference to FIG. 2 and FIG. 3, among others. The engine unit 28 is provided with an engine 29 that has a crank shaft 30, a centrifugal clutch 36, a shift clutch 37 that is engaged and disengaged during a shift operation, and a speed change device 38, such as a multi-speed transmission. Note that, the type of the engine 29 that is used is not limited. However, in this embodiment, the engine 29 is a 4-stroke single cylinder engine. The engine 29 is not limited to an internal combustion engine, such as the gasoline engine of this embodiment. Accordingly, the engine 29 may be a electric motor or the like. In addition, the above-described engine may be an engine that combines a gasoline engine and an electric motor.

Figure 3:
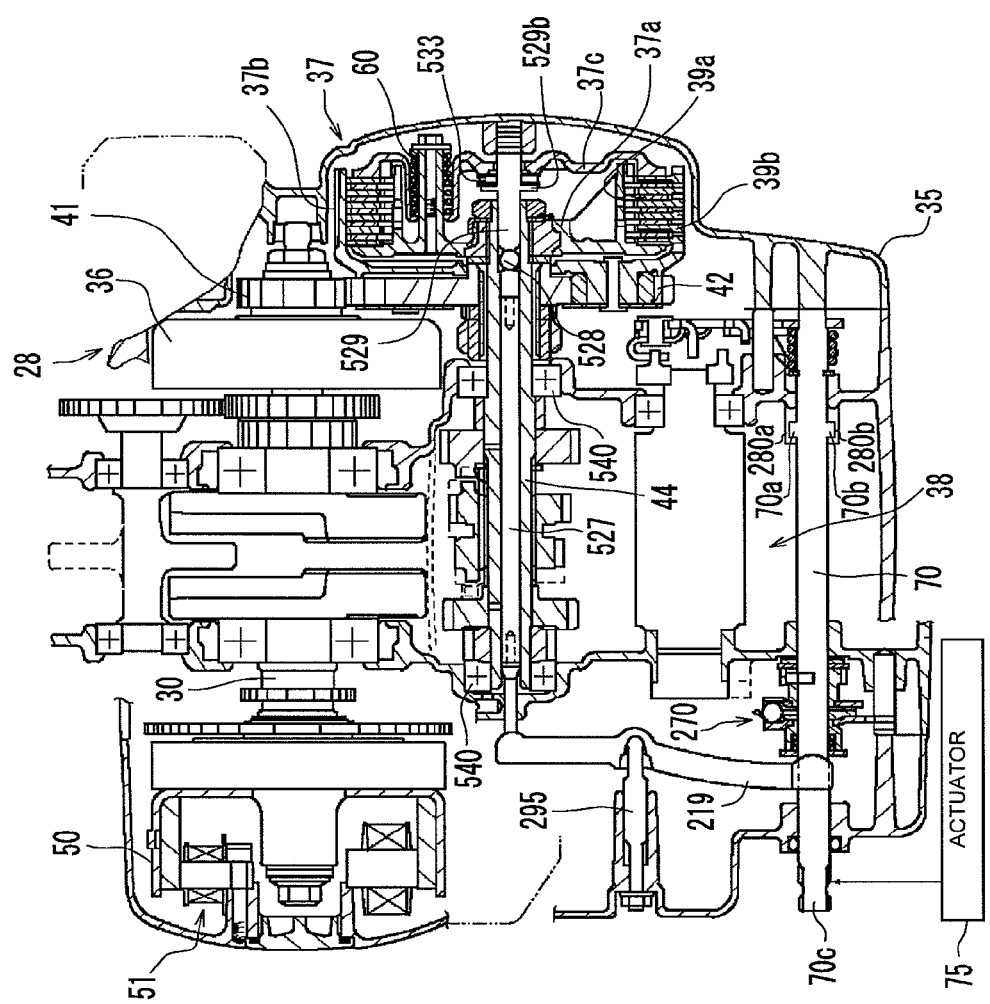
FIG. 3 is another cross sectional view of the engine unit of FIG. 2.

As shown in FIG. 3, the centrifugal clutch 36 is attached to a right end section of the crank shaft 30. Although omitted from the figures, the centrifugal clutch 36 is provided with a clutch boss fixed to the crank shaft 30, and a clutch housing. The centrifugal clutch 36 is disengaged during idling, and is engaged when the vehicle is running. More specifically, the centrifugal clutch 36 is disengaged when the rotation speed of the crank shaft 30 (the engine speed) is smaller than a defined rotation speed, and is engaged at a rotation speed equal to or above the defined rotation speed.

The shift clutch 37 is a wet-type multi disk clutch, and is provided with a clutch boss 37a and a clutch housing 37b. Note that, the type of shift clutch 37 used is not limited. A gear 41 is provided in the centrifugal clutch 36, and a gear 42 is provided in the clutch housing 37b of the shift clutch 37. The gear 41 and the gear 42 are intermeshed. As a result, the clutch housing 37b of the shift clutch 37 turns along with the centrifugal clutch 36 (more specifically, the clutch housing of the centrifugal clutch 36).

The clutch boss 37a is attached to a main shaft 44, and rotates along with the main shaft 44. The clutch housing 37b is attached to the main shaft 44 such that the clutch housing 37b can rotate freely. A plurality of friction plates 39a are coupled for rotation with the clutch boss 37a, and a plurality of clutch plates 39b are coupled for rotation with the clutch housing 37b. Each one of the friction plates 39a is disposed between neighboring clutch plates 39b.

A pressure plate 37c is disposed to the right side of the clutch boss 37a. The pressure plate 37c is able to slide freely in the axial direction, and is urged by a compression spring 60 toward the left in FIG. 3. More specifically, the pressure plate 37c is urged in a direction that presses the friction plates 39a and the clutch plates 39b together. When the pressure plate 37c moves toward the right against the urging force of the compression spring 60, the friction plates 39a and the clutch plates 39b separate from one another to permit relative rotation therebetween, and the shift clutch 37 is disengaged.

Figure 2:
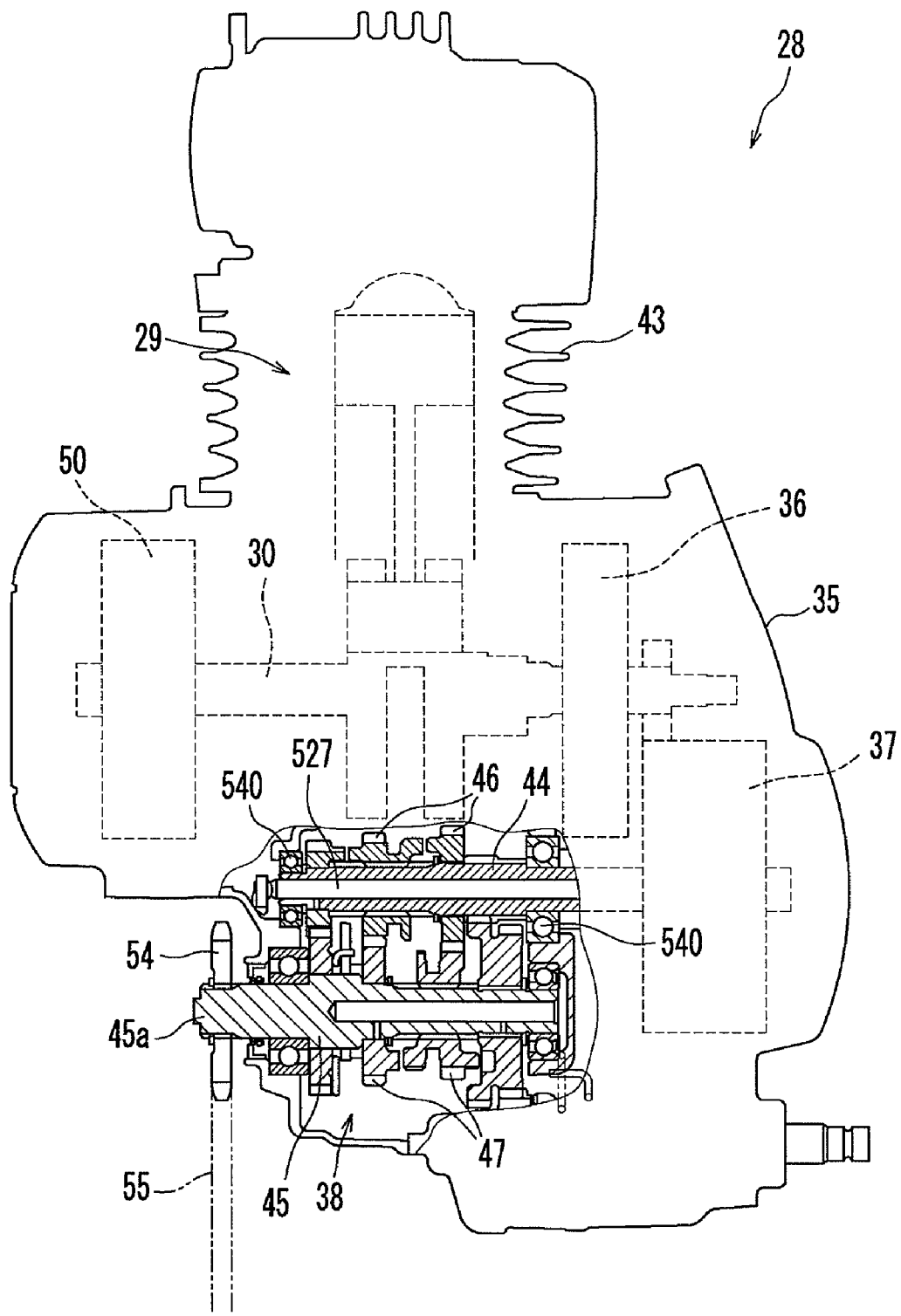
FIG. 2 is a partial cross sectional view of an engine unit of the motorcycle of FIG. 1.

As shown in FIG. 2, a plurality of speed gears 46 extends from the outer periphery of the main shaft 44. A plurality of speed gears 47 are attached to a drive shaft 45 that is disposed parallel to the main shaft 44. The speed gears 46 on the side of the main shaft 44 and the speed gears 47 on the side of the drive shaft 45 are suitably meshed.

The speed gears 46 and the speed gears 47 are attached such that, apart from the gears that are selected, either one or both of the speed gears 46 and the speed gears 47 rotate idly with respect to the main shaft 44 or the drive shaft 45. As a result, driving force is only transmitted from the main shaft 44 to the drive shaft 45 via whichever pair of the speed gears has been selected.

Figure 4:
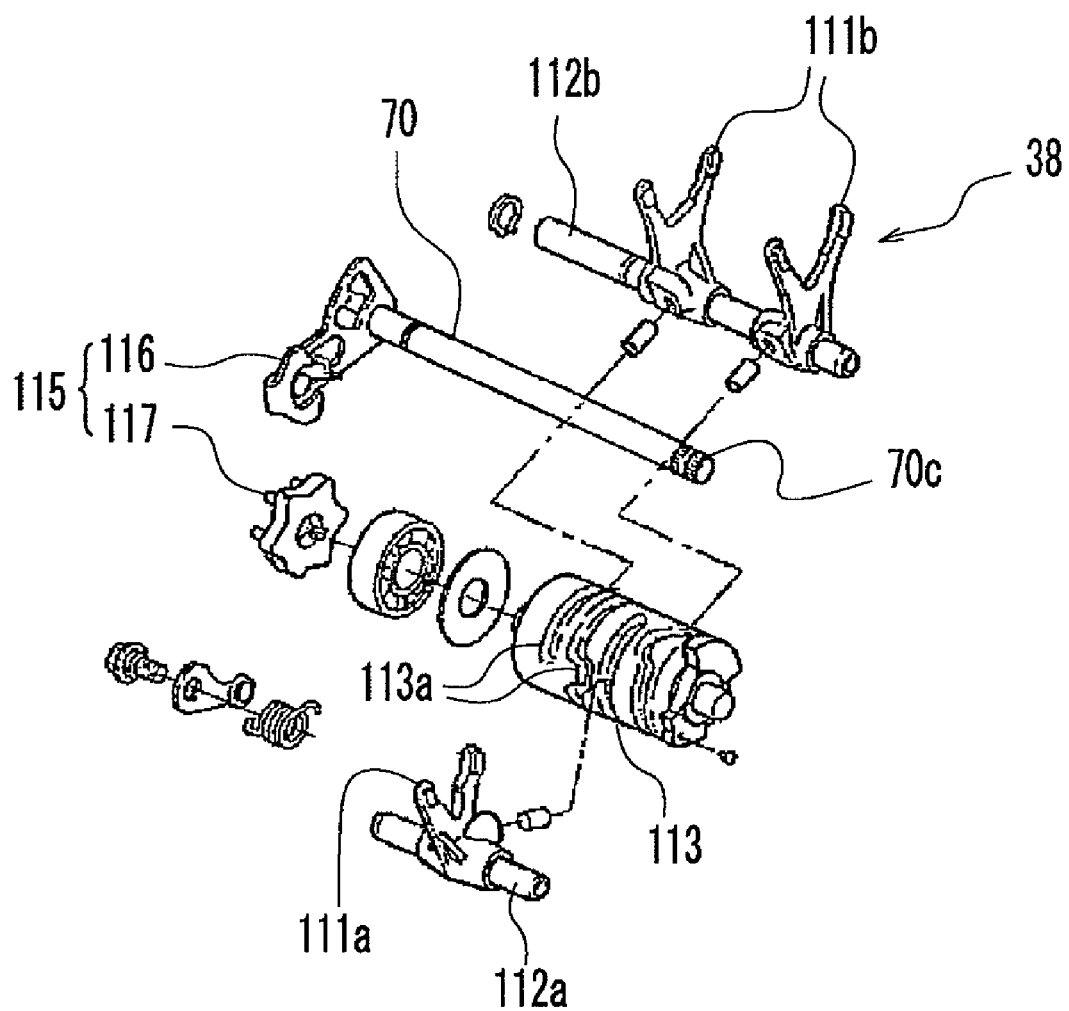
FIG. 4 is an exploded perspective view of a section of a speed change device of the engine unit of FIG. 2.

Selection of the speed gears is performed using a shift cam 113 (refer to FIG. 4). As shown in FIG. 4, the speed change device 38 is provided with a shift fork 111a that slides the speed gears 46 in the axial direction of the main shaft 44, and a slide rod 112a that supports the shift fork 111a such that the shift fork 111a can slide freely. In addition, the speed change device 38 is also provided with a shift fork 111b that slides the speed gears 47 in the axial direction of the drive shaft 45, and a slide rod 112b that supports the shift fork 111b such that the shift fork 111b can slide freely. Cam grooves 113a are formed around the periphery of the shift cam 113, and the shift forks 111a, 111b slide along the cam grooves 113a.

The shift cam 113 turns via a ratchet mechanism 115 when a shift shaft 70 turns. Note that, the ratchet mechanism 115 corresponds to a speed change device transmission mechanism of the invention. The ratchet mechanism 115 rotates the shift cam 113 a defined distance (angle) each time it rotates the shift cam 113, and moves the shift forks 111a, 111b in a regular manner. The ratchet mechanism 115 functions as a ratchet that shifts one speed at a time in the forward or reverse directions. A shift arm 116 of the ratchet mechanism 115 transmits the rotation of the shift shaft 70, and also regulates the stroke of the shift shaft 70 to prevent overrun of the shift cam 113. In addition, a stopper plate 117 of the ratchet mechanism 115 is provided to fix the shift cam 113 in a defined position.

Figure 5:
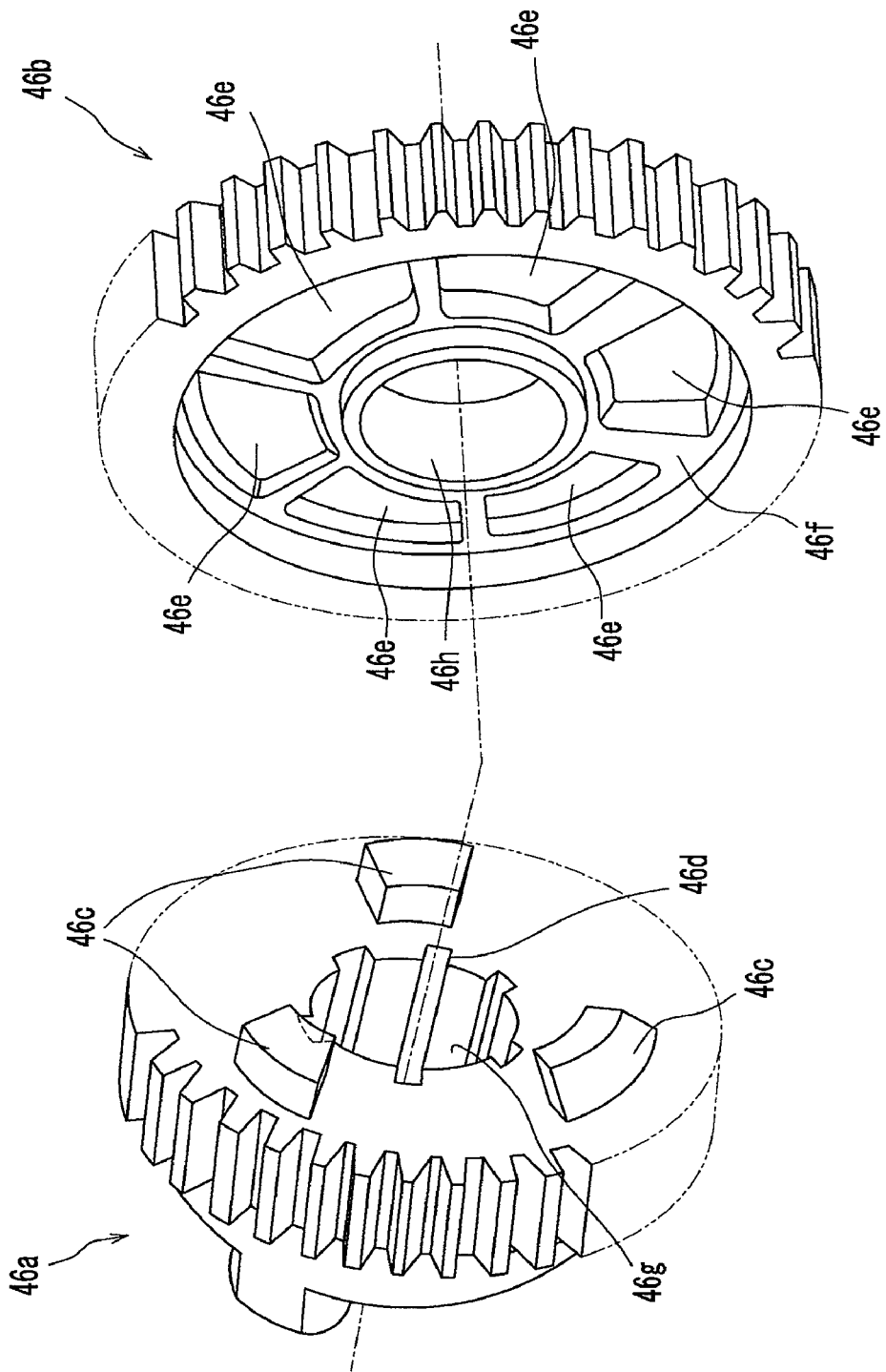
FIG. 5 is a perspective view of a speed gear of the speed change device.

The illustrated speed change device 38 is a dog clutch transmission. As shown in FIG. 5, the speed gears 46 include a first gear 46a that is formed with an engagement protrusion 46c in a shaft end surface, and a second gear 46b that is formed with an engagement groove 46e in an axial end surface that faces the engagement protrusion 46c. The speed change device 38 is provided with a plurality of the first gears 46a and the second gears 46b. Note that, the speed gears 47 (FIG. 2) have the same structure as the speed gears 46, and thus are omitted from this explanation. In the illustrated arrangement, three of the engagement protrusions 46c are formed in each first gear 46a. These engagement protrusions 46c are positioned evenly in the circumferential direction along the outer edge section of the axial end surface of each first gear 46a. In addition, in the illustrated arrangement, six of the engagement grooves 46e are formed in the second gear 46b. These engagement grooves 46e are also positioned evenly in the circumferential direction.

In addition, a through hole 46g, into which the main shaft 44 and the drive shaft 45 are inserted, is formed in a shaft center section of each first gear 46a. A plurality of grooves 46d are formed in the periphery surface of the through hole 46g. Note that, as shown in FIG. 2, the main shaft 44 is inserted into the speed gears 46, and the drive shaft 45 is inserted into the speed gears 47. The first gears 46a are spline fitted to the main shaft 44 and the drive shaft 45. Through holes 46h into which the main shaft 44 and the drive shaft 45 are inserted are also formed in the second gears 46b. However, no grooves are formed in the through holes 46h. Accordingly, the second gears 46b are attached to the main shaft 44 and the drive shaft 45 such that the second gears 46b rotate idly.

When the shift cam 113 (FIG. 4) rotates, the shift fork 111a moves along the cam grooves 113a, and the first gear 46a moves in association therewith along the splines of the main shaft 44 and the drive shaft 45 in the axial direction. In addition, the engagement protrusions 46c of the first gear 46a are engaged with the engagement grooves 46e of the second gear 46b, whereby the combination of the speed gears 46, 47 that transmit driving force from the main shaft 44 to the drive shaft 45 is switched, thus performing a gear change.

However, when the shift cam 113 rotates and the first gear 46a has moved in the axial direction, there are occasions when the engagement protrusions 46c of the first gear 46a do not engage with the engagement grooves 46e of the second gear 46b, and instead the engagement protrusions 46c abuts against an axial end surface 46f of the second gear 46b such that coupling does not take place properly and clash occurs. In this clashing state, the first gear 46a and the second gear 46b are not engaged, and thus the first gear 46a and the second gear 46b remain in an abutting state without the gear change being performed reliably.

As shown in FIG. 3, the hollow main shaft 44 is supported by a pair of shaft bearings 540 so as to be freely rotatable. A first push rod 527, a ball 528, and a second push rod 529 are inserted inside the main shaft 44 so as to be movable in the axial direction. When these members move, the pressure plate 37c is moved in the left-right direction.

A flange member 529b is formed on the second push rod 529, and a bearing 533 is interposed between the flange member 529b and the pressure plate 37c. As a result, in contrast to the second push rod 529 that is not able to rotate, the pressure plate 37c can rotate.

Figure 6:
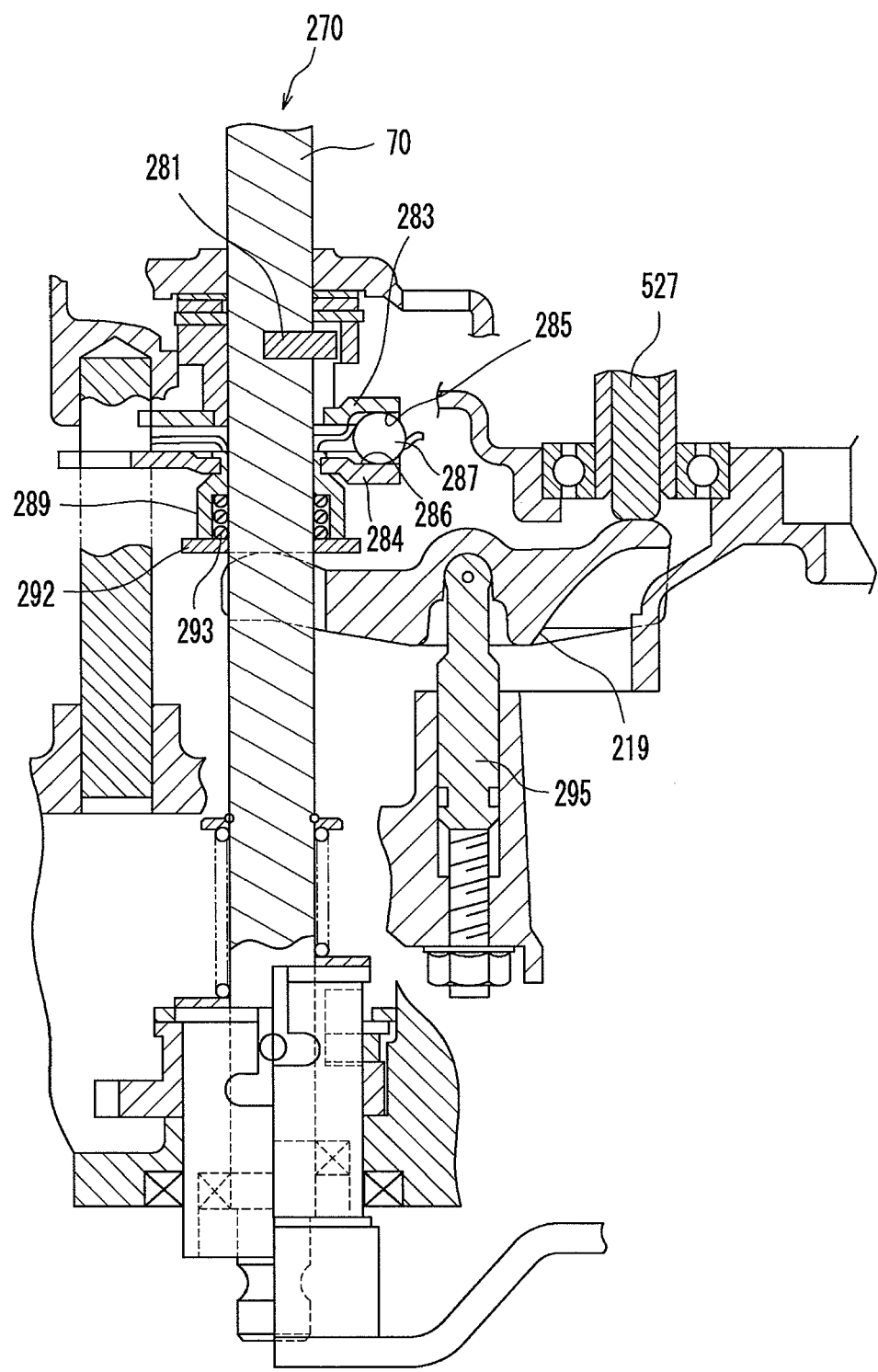
FIG. 6 is an expanded cross sectional view showing a clutch transmission mechanism of the engine unit of FIG. 3.

Rotation of the shift shaft 70 is converted into reciprocating motion of the first push rod 527 by a clutch transmission mechanism 270. FIG. 6 is an expanded cross sectional view showing the clutch transmission mechanism 270 of FIG. 3. The clutch transmission mechanism 270 shown in FIG. 6 is a ball cam mechanism that converts rotation of the shift shaft 70 into reciprocating motion.

The clutch transmission mechanism 270 is provided with a first cam plate 283 that rotates along with the shift shaft 70, and a second cam plate 284 that faces the first cam plate 283. The first cam plate 283 is connected to the shift shaft 70 via a connection pin 281. A first cam groove 285 and a second cam groove 286 are respectively formed in the opposing faces of the first cam plate 283 and the second cam plate 284.

In addition, the clutch transmission mechanism 270 is provided with three balls 287 (in FIG. 6 only one is shown) that are sandwiched between the first cam plate 283 and the second cam plate 284. These balls 287 engage with the first cam groove 285 and the second cam groove 286. The first and the second cam plate 283, 284 have a disc shape. Moreover, the first cam plate 283 is firmly attached to the shift shaft 70.

Furthermore, the second cam plate 284 is firmly attached to a boss 289 that can move in the axial direction of the shift shaft 70. A pressing plate 292 is firmly attached to a lower end section of the boss 289. The pressing plate 292 abuts against a pressure lever 219, described hereinafter. In addition, a compression coil spring 293 is interposed between the pressing plate 292 and the boss 289.

A left end section of the pressure lever 219 abuts against the pressing plate 292. In addition, a right end section of the pressure lever 219 abuts against the first push rod 527 (FIG. 3). Furthermore, a central section in the longitudinal direction of the pressure lever 219 is supported by a spindle 295. The pressure lever 219 is able to swing centering on the contact point of the pressure lever 219 and the spindle 295 as a fulcrum.

When the shift shaft 70 rotates in association with rotation of an actuator 75 (FIG. 3), the first cam plate 283 also moves in association therewith. Because the second cam plate 284 does not rotate in association with the shift shaft 70, the first cam plate 283 rotates relatively with respect to the second cam plate 284. At this time, the balls 287 move in the circumferential direction in the cam groove 286 of the second cam plate 284 while being held by the cam groove 285 of the first cam plate 283. When the shift shaft 70 rotates still further, the balls 287 pass out of the cam groove 286 and thus leave the cam groove 286. As a result of the balls 287 leaving the cam groove 286 in this manner, the second cam plate 284 moves in the axial direction of the shift shaft 70. As a result of this movement of the second cam plate 284, the left end section of the pressure lever 219 is pressed against by the boss 289.

When the left end section of the pressure lever 219 is pressed against by the boss 289, the pressure lever 219 swings centering on the connection point with the spindle 295 as a fulcrum. As a result, the first push rod 527 is pressed against by the right end section of the pressure lever 219. In addition, as a result of the first push rod 527 being pressed against by the pressure lever 219, the first push rod 527 slides in the rightward direction as shown in FIG. 3. Moreover, the second push rod 529 is pressed in the rightward direction by the first push rod 527 via the balls 528, and thus slides in the rightward direction.

As shown in FIG. 3, as a result of the second push rod 529 sliding, the pressure plate 37c moves in the rightward direction against the urging force of the compression spring 60. Accordingly, pressurized contact of the friction plates 39a and clutch plates 39b is released, and the shift clutch 37 is disengaged.

In this manner, the shift shaft 70 and the pressure plate 37c are connected via the pressure lever 219, the first push rod 527, the balls 528, and the second push rod 529, and the pressure plate 37c moves in accordance with rotation of the shift shaft 70. More specifically, when the shift shaft 70 starts to rotate, the pressure plate 37c moves in the rightward direction, and when the rotation angle of the shift shaft 70 reaches a defined angle (clutch disengagement start angle), the shift clutch 37 is disengaged. Furthermore, when the shift shaft 70 rotates still further until another defined angle (shift start angle), the shift cam 113 (FIG. 4) rotates, and the shift operation is performed.

As shown in FIG. 3, abutting members 70a, 70b that protrude outwards in the radial direction are respectively formed in the shift shaft 70. In addition, stoppers 280a, 280b that respectively abut with the abutting members 70a, 70b are formed in the crank case 35. The stoppers 280a, 280b regulate rotation of the shift shaft 70. More specifically, when the shift shaft 70 rotates in an up-shift direction (reverse rotation), the stopper 280a abuts the abutting member 70a, thereby regulating rotation of the shift shaft 70. On the other hand, when the shift shaft 70 rotates in a down-shift direction (normal rotation), the stopper 280b abuts the abutting member 70b, thereby regulating rotation of the shift shaft 70. The stoppers are not limited to being the stoppers 280a, 280b shown in FIG. 3. So long as a structure is adopted that can regulate rotation of the shift shaft 70, various types of structural members may be used. The rotation angle of the shift shaft 70 when the stoppers 280a, 280b regulate rotation is the mechanical maximum rotation angle of the shift shaft 70.

As shown in FIG. 3, a flywheel magnet 50 is attached to a left end section of the crank shaft 30. The flywheel magnet 50 is structured by a rotor of a generator 51.

A section of the shift shaft 70 that protrudes outside the crank case 35 defines a protruding section 70c. As shown in FIG. 2, a section of the drive shaft 45 that protrudes outwards from the crank case 35 defines a protruding section 45a of the drive shaft 45, and a sprocket 54 is fixed thereto. A chain 55 that functions as a driving force transmission member is wrapped around this sprocket 54 and a sprocket (not shown) of the rear wheel 26.

Figure 7:
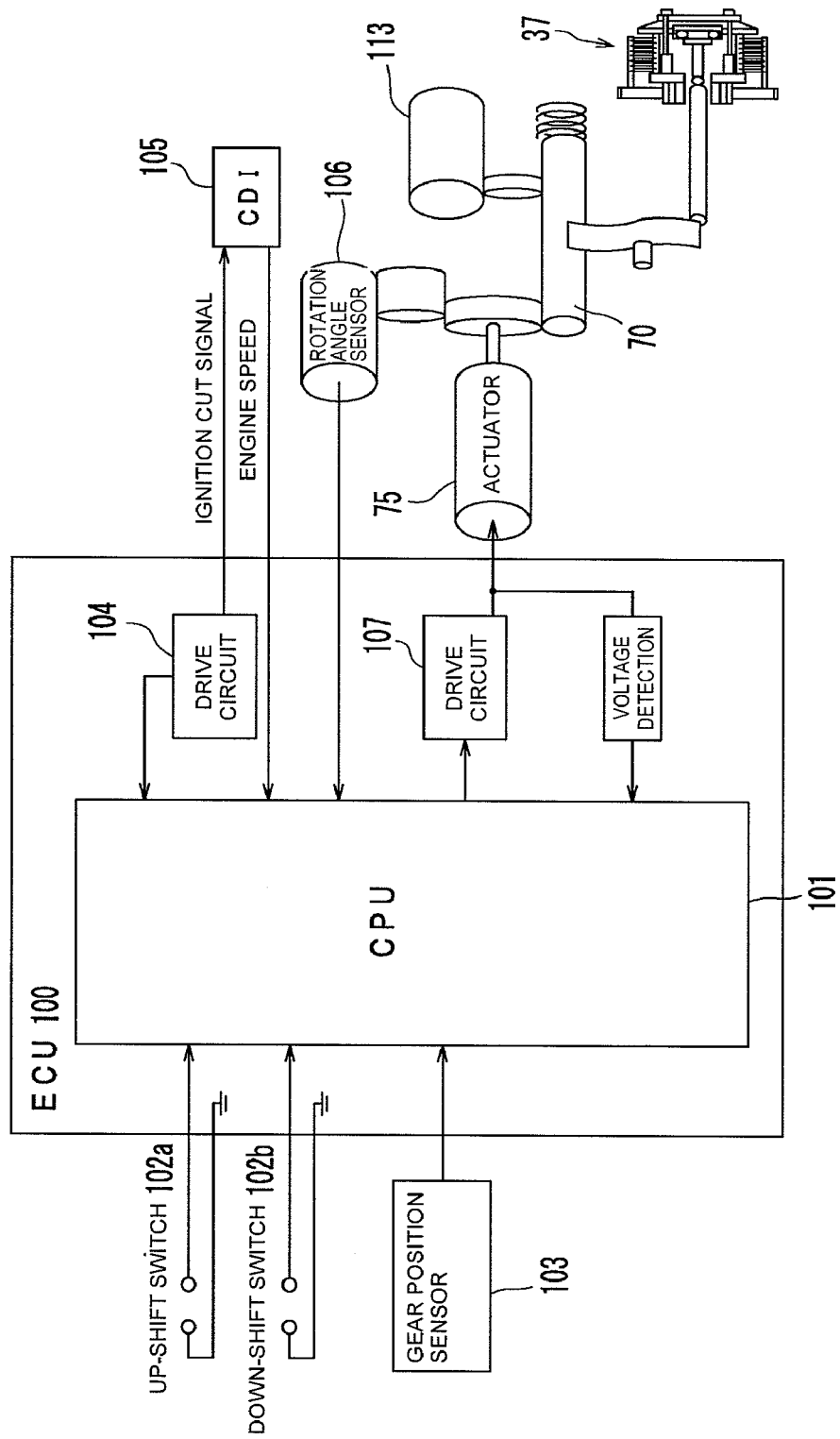
FIG. 7 is a block diagram of the overall structure of a control system of the motorcycle of FIG. 1.

FIG. 7 is a block diagram that schematically shows the overall structure of a control system of the motorcycle 10. An ECU (engine control unit) 100 is provided with a CPU 101 that is connected to an up-shift switch 102a and a down-shift switch 102b. The up-shift switch 102a and the down-shift switch 102b are provided, for example, on a left handle 94 of the motorcycle 10 (FIG. 1), and are switches that are operated by an operator of the motorcycle 10 to perform a gear change shift (an up-shift or a down-shift).

In addition, a gear position sensor 103 is connected to the CPU 101 of the ECU 100. The gear position sensor 103 is a sensor that detects the gear position (a rotational position of the shift cam 113). The CPU 101 uses the rotational position of the shift cam 113 (FIG. 4) detected by the gear position sensor 103 as a basis for obtaining the gear position. The gear position sensor 103 corresponds to a gear position detection device of the invention in the illustrated arrangement.

Moreover, the CPU 101 is connected to a CDI (Capacitive Discharge Ignition) 105 via a drive circuit 104. The CDI 105 uses an ignition cut signal supplied via the drive circuit 104 from the CPU 101 as a basis for performing ignition cut of the engine 29 (FIG. 2), thereby reducing driving force of the engine 29. In addition, the CDI 105 detects a rotational speed of the engine 29 (the engine speed) and supplies the detection result to the CPU 101.

Moreover, an actuator 75 (FIG. 3) is connected to the CPU 101 via the drive circuit 107. The actuator 75 includes an electric motor (not shown). When the actuator 75 is driven, the shift shaft 70 is rotated. The drive circuit 107 uses a control signal from the CPU 101 as a basis for performing drive control (PWM (Pulse Width Modulation) control) of the electric motor in the actuator 75.

In addition, the CPU 101 is connected to a rotation angle sensor 106. The rotation angle sensor 106 detects the rotation angle of the shift shaft 70 (FIG. 3). Note that, the rotation angle sensor 106 corresponds to a rotation angle detection device of the invention in the illustrated embodiment. The rotation angle sensor 106 may be a device that directly detects the rotation angle of the shift shaft 70 or may be a device that indirectly detects the rotation angle, such as through another component that moves along with the shift shaft 70.

Figure 8:
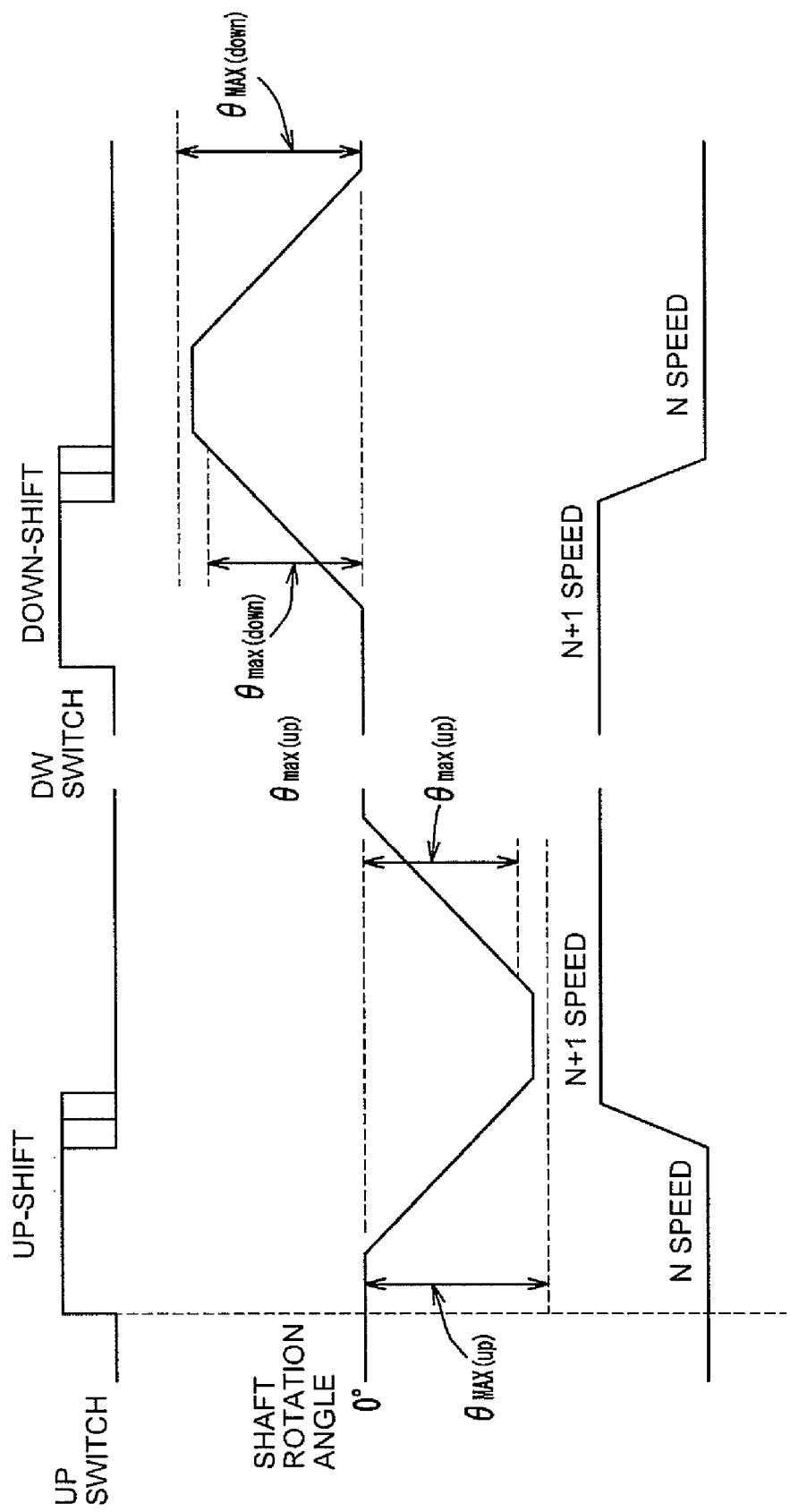
FIG. 8 is an explanatory figure that illustrates a gear change shift operation.

The gear change shift operation during running of the motorcycle 10 shown in FIG. 1 to FIG. 7 is explained with additional reference to FIG. 8. FIG. 8 is an explanatory figure that illustrates the gear change shift operation. As shown in FIG. 8, when an up-shift operation is performed (when the up-shift switch 102a is operated), the shift shaft 70 performs a reciprocating rotational motion in which the shift shaft 70 rotates till its rotation angle is a target angle θmax(up) (reverse rotation), and then returns to a reference angle (0°). On the other hand, when a down-shift operation is performed (when the down-shift switch 102b is operated), the shift shaft 70 performs a reciprocating rotational motion in which the shift shaft 70 rotates till its rotation angle is a target angle θmax(down) (normal rotation), and then returns to the reference angle (0°).

Note that, here, the target angles θmax(up), θmax(down) are set respectively at the mechanical maximum rotation angles (design values) of the shift shaft 70 in the reverse rotation direction and the normal rotation direction. The mechanical maximum rotation angles are rotation angles of the shift shaft 70 when, as described above, the rotation of the shift shaft 70 is regulated in the reverse rotation direction and the normal rotation direction.

However, both the target angles θmax(up), θmax(down) are design values for the above-described mechanical maximum rotation angles. As a result, there are occasions when the target angles θmax(up), θmax(down) deviate from the actual mechanical maximum rotation angles as a result of design error, assembly error and the like (including normal manufacturing variations) of the structural components of the clutch transmission mechanism 270.

The θMAX(up), θMAX(down) shown in FIG. 8 are respective actual mechanical maximum rotation angles of the shift shaft 70 in the reverse rotation direction and the normal rotation direction. FIG. 8 illustrates situation in which the target angles θmax(up), θmax(down) are different from the respective actual mechanical maximum rotation angles θMAX(up), θMAX(down). Note that, in FIG. 8, the target angles θmax(up), θmax(down) are respectively smaller than the mechanical maximum rotation angles θMAX(up), θMAX(down). However, it will be clearly apparent that there are occasions when the target angles are larger than the mechanical maximum rotation angles. In addition, the target angles θmax(up), θmax(down) may be the same as or different from each other. Moreover, the actual mechanical maximum rotation angles θMAX(up), θMAX(down) may also be the same as or different from each other.

While the shift shaft 70 performs reciprocating rotational motion, a series of gear change shift operations is performed, including, disengagement of the shift clutch 37, gear change of the speed change device 38, and engagement of the shift clutch 37.

Figure 9:
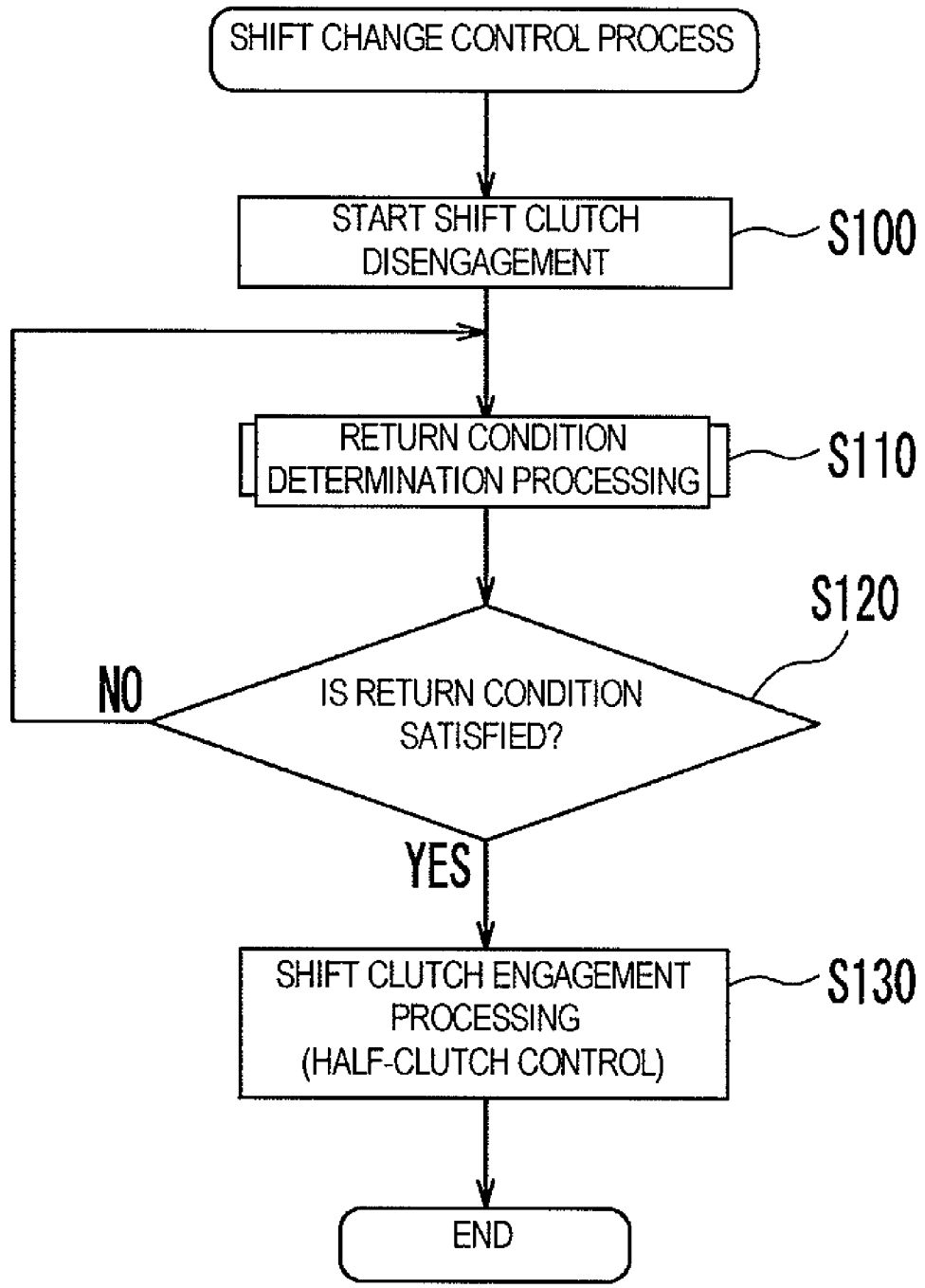
FIG. 9 is a flow chart showing a preferred gear change shift control process.

The gear change shift operation is explained in more detail with reference to FIG. 9. FIG. 9 is a flow chart showing a gear change shift control process. This gear change shift control process is executed when it is invoked from a main routine that is already being executed when a gear change shift operation is performed, that is, when the up-shift switch 102a or the down-shift switch 102b is operated.

When the gear change shift control process starts, first, at block S100, processing is performed that starts disengagement of the shift clutch 37. In this processing, the ECU 100 controls the drive of the actuator 75 to start rotation of the shift shaft 70, whereby the disengagement of the shift clutch 37 is started. Note that, at block S100, the shift shaft 70 rotates at the maximum rotational speed.

Once the processing at block S100 has been performed, next, return condition determination processing is performed at block S110. In this processing, the ECU 100 determines whether or not a return condition, which is a condition for shifting to the engagement process of the shift clutch 37, is satisfied. This return condition determination processing is explained in greater detail hereinafter with reference to FIG. 10.

Once the processing at block S110 has been performed, next, it is determined whether the return condition is satisfied at block S120. In this processing, the ECU 100 determines whether or not a return condition satisfied flag, which indicates whether the return condition is satisfied, is ON. The return condition satisfied flag is set in the return condition determination processing at block S110 described above. When it is determined that the return condition is not satisfied, the processing returns to block S110 and waits until the return condition is satisfied.

On the other hand, when it is determined that the return condition is satisfied at block S120, next, engagement of the shift clutch 37 is performed at block S130. In this processing, the ECU 100 supplies a drive signal to the actuator 75, whereby the actuator 75 engages the shift clutch 37. Note that, at block S130, from when engagement of the shift clutch 37 is started until when a defined clutch position is reached, half clutch control is performed in which the shift clutch 37 is gradually engaged. Once the processing at block S130 has been performed, the gear change shift control process is ended.

Figure 10:
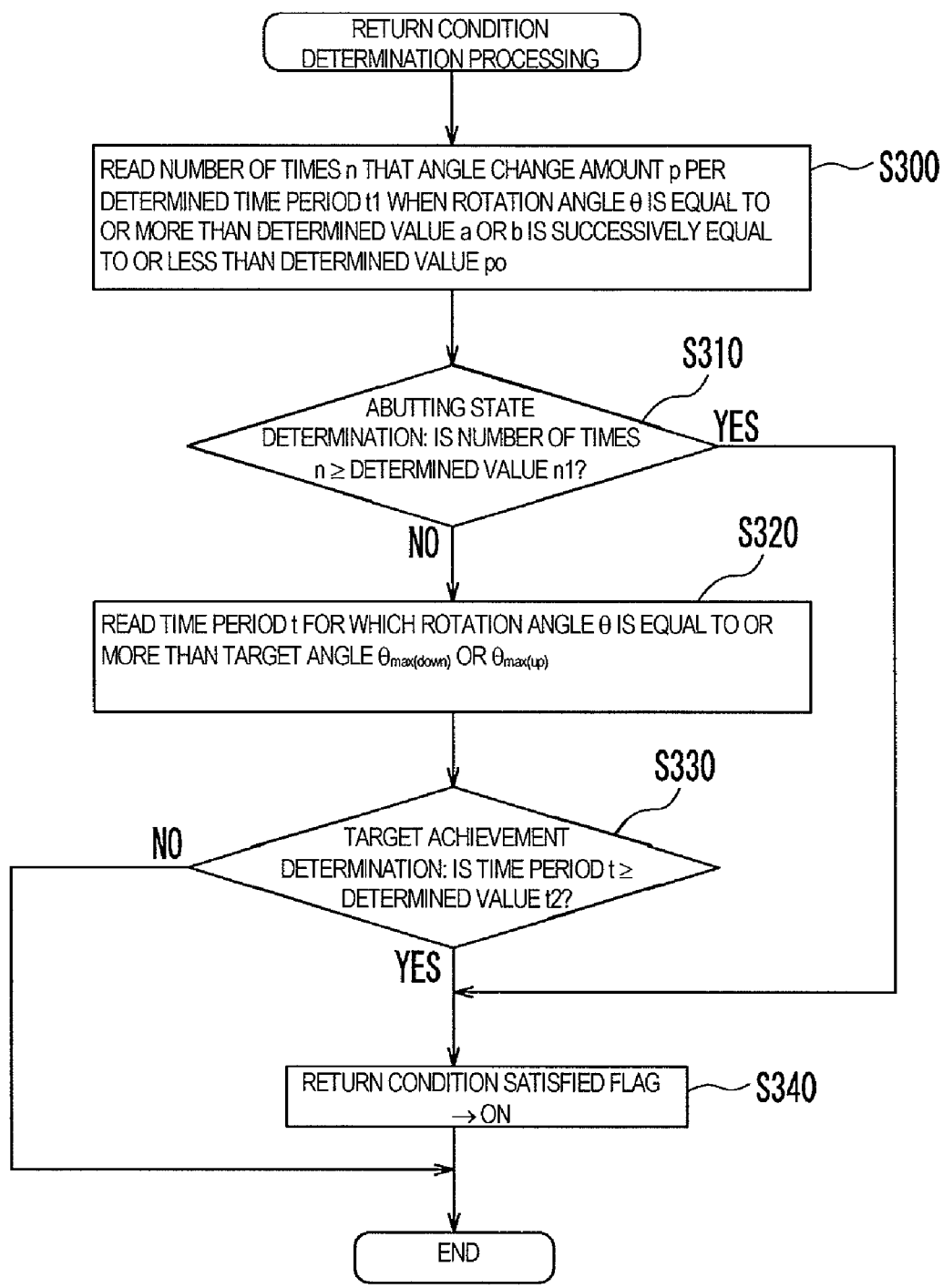
FIG. 10 is a flow chart showing a preferred return condition determination process.

FIG. 10 is used to explain the return condition determination processing that is invoked and executed at block S110 of the flow chart shown in FIG. 9. Basically speaking, this return condition determination processing performs two determinations, namely, an abutting state determination in which it is determined whether or not the rotation angle of the shift shaft 70 has reached the θMAX(up) or θMAX(down) that are the actual mechanical maximum rotation angles, and a target achievement determination in which it is determined whether or not the rotation angle of the shift shaft 70 has reached the target angles θmax(up) or θmax(down). In addition, if either one of the two determinations is satisfied, it is taken that the return condition has been satisfied, and the above-described return condition satisfied flag is set to ON.

Once the return condition determination processing has started, first, at block S300, a number of times n at which a change amount (an angle change amount) of the rotation angle of the shift shaft 70 has become tiny (or zero) is read. Here, the ECU 100 calculates in a separate process an angle change amount p per a particular time period t1 when the rotation angle of the shift shaft 70 has become equal to or more than a defined value a or b (a, b are respective defined values when the shift shaft 70 has rotated in the reverse rotation direction or the normal rotation direction). Note that, the calculation of the angle change amount p is performed based on the detection result of the rotation angle sensor 106 (FIG. 7). In addition, each time the angle change amount p is calculated, the ECU 100 determines whether or not the angle change amount p is equal to or less than a defined value po, and counts up the number of times n that the angle change amount p is successively equal to or less than the defined value po. At block S300, the ECU 100 reads the counted number of times n.

Once the processing at block S300 has been performed, next, at block S310, the abutting state determination is performed. In this processing, the ECU 100 determines whether or not the number of times n read at block S300 is equal or more than a defined value n1. When the processing at block S310 is performed, the ECU 100 functions as a first determination device of the invention in the illustrated arrangement.

Here, the fact that the angle change amount p of the shift shaft 70 has become tiny (equal to or less than the defined value po) indicates that the rotation of the shift shaft 70 is being regulated. Furthermore, the fact that the rotation number at which the angle change amount p becomes tiny is equal to or more than the defined rotation number n1 indicates that the rotation of the shift shaft 70 is being regulated throughout a determined period. In this embodiment, when the rotation of the shift shaft 70 is regulated throughout the determined period, it is determined that the shift shaft 70 has abutted against some other member.

Figure 11:
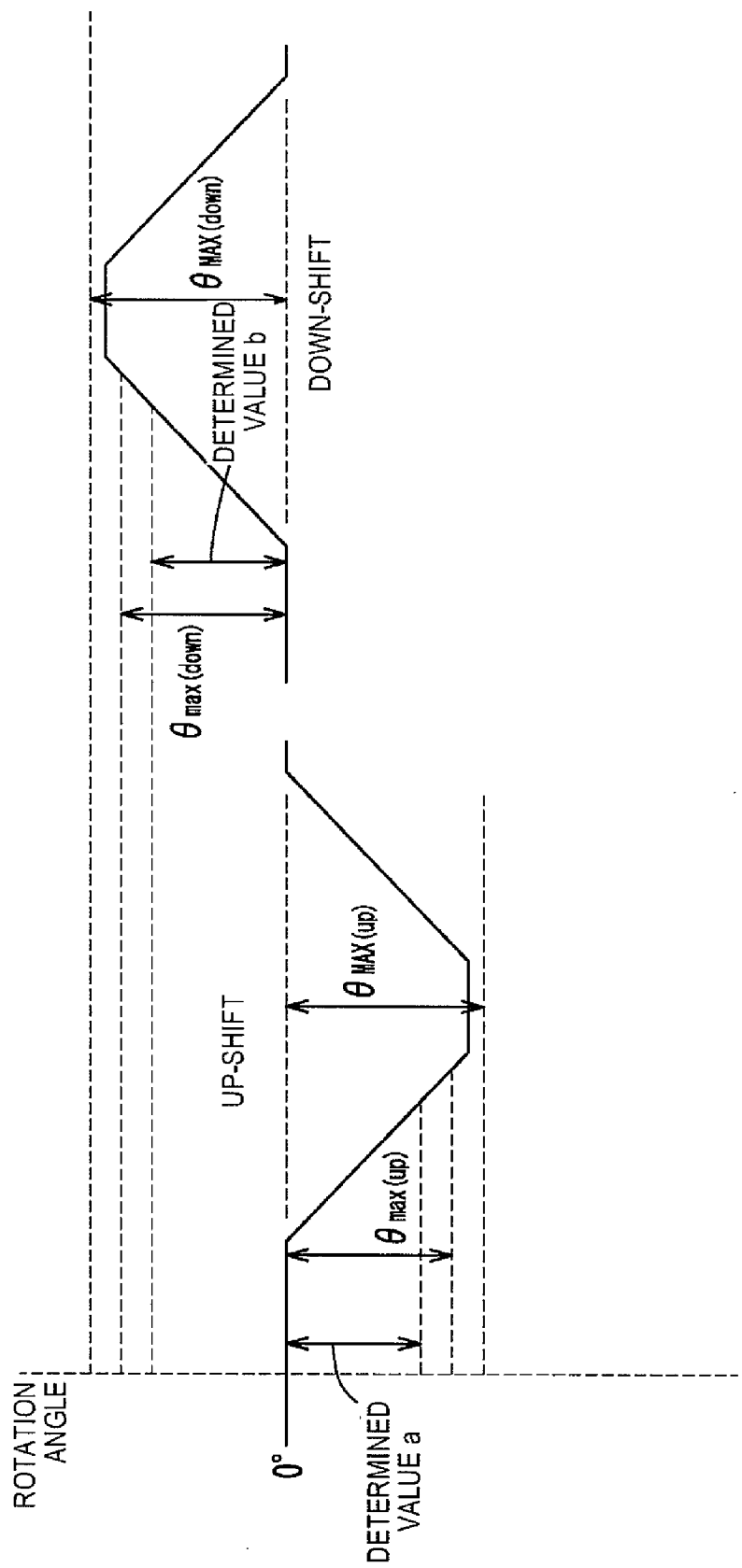
FIG. 11 is an explanatory view that illustrates the magnitude of determined values used during an abutting state determination.

FIG. 11 is an explanatory view that illustrates the magnitude of the above-described defined values a, b of the present embodiment. In the embodiment, as shown in FIG. 11, the defined value a is larger than a rotation angle that is intermediate between the reference angle (0°) and the target angle θmax(up). As a result, when the rotation angle of the shift shaft 70 becomes equal to or more than the defined value a, the rotation angle becomes comparatively closer to the actual mechanical maximum rotation angle θMAX(up). In addition, similarly, when the rotation angle of the shift shaft 70 becomes equal to or more than the defined value b, the rotation angle becomes comparatively closer to the actual mechanical maximum rotation angle θMAX(down). Note that, in the present invention, the defined values a, b are not limited to the values shown in FIG. 11. More specifically, the defined value a may be smaller than the rotation angle that is intermediate between the reference angle (0°) and the target angle θmax(up). In addition, the defined value b may be smaller than the rotation angle that is intermediate between the reference angle (0°) and the target angle θmax(down).

In this embodiment, in addition to the determination condition described above for determining whether the shift shaft 70 has abutted against some other member, another determination condition is set, namely, whether or not the rotation angle of the shift shaft 70 at the time when the shift shaft 70 has abutted against some other member is near to the mechanical maximum rotation angle. Accordingly, if it is determined that the shift shaft 70 is abutting against some other member, and also determined that the rotation angle of the shift shaft 70 is near to the mechanical maximum rotation angle, it is determined that the shift shaft 70 has reached the mechanical maximum rotation angle. More specifically, it is determined that the shift shaft 70 is abutting against the stopper 280a or 280b (refer to FIG. 3). In this manner, as a result of setting the condition that the rotation angle of the shift shaft 70 is equal to or more than the defined value a or b, it is possible to more accurately determine that the rotation angle of the shift shaft 70 has reached the mechanical maximum rotation angle.

When it is determined at block S310 that the number of times n is equal to or more than the defined value n1 (that the shift shaft 70 is abutting against the stopper 280a or 280b), next, the return condition satisfied flag is set to ON at block S340. Once the return condition satisfied flag is set to ON, the processing at block S130 of the gear change shift control process (FIG. 9) performs engagement of the shift clutch 37. Following the processing of block S340, the return condition determination processing is ended.

On the other hand, if it is determined at block S310 that the number of times n is not equal to or more than the defined value n1 (i.e., is less than n1), next, the time period t for which the rotation angle has been equal to or more than the target angle is read at block S320. Here, the ECU 100 measures in a separate process the time period t for which the rotation angle θ of the shift shaft 70 has been equal to or more than the target angle θmax(up) or θmax(down). Note that, the determination as to whether the rotation angle θ is equal to or more than the target angle is made based on the detection result of the rotation angle sensor 106 (FIG. 7). At block S320, the ECU 100 reads the measured time period t.

Following the processing at block S320, next, target achievement determination is performed at block S330. In this processing, the ECU 100 determines whether the time period t read at block S320 is equal to or more than a defined value t2. When the processing of block S330 is performed, the ECU 100 functions as a second determination device of the invention in the illustrated arrangement.

If it is determined that the time period t is equal to or more than the defined value t2 at block S330, next, the above-described processing at block S340 is performed, and the return condition satisfied flag is set to ON. On the other hand, if it is determined that the time period t is not equal to or more than the defined value t2 at block S330 (i.e., is less than t2), the return condition determination processing is ended. At this time, the processing at block S340 is not performed and the return condition satisfied flag is held at OFF.

Note that, in this embodiment, the target angles θmax(up), θmax(down) are respectively set at the mechanical maximum rotation angles (the design values) of the shift shaft 70. As described above, there are occasions when the actual mechanical maximum rotation angles θMAX(up), θMAX(down) deviate from the above-described design values due to design error, assembly error and the like (including normal manufacturing variations) of the structural members of the clutch transmission mechanism 270 (FIG. 3). However, in this embodiment, when the rotation angle of the shift shaft 70 is equal to or more than the target value throughout the determined or defined time period t2, the return determination satisfied flag is set to ON. More specifically, after the rotation angle of the shift shaft 70 has definitely exceeded the target angle, engagement of the shift clutch 37 (reverse rotation of the shift shaft 70) is started. As a result, it is possible to reliably perform a gear change shift.

As explained above, in the motorcycle 10 according to the illustrated embodiment, first, the number of times n is calculated, namely, the number of times n that the angle change amount p per determined or defined time period t1 is successively equal to or less than the defined value po when the rotation angle θ of the shift shaft 70 is equal to or more than the defined value a or b. In addition, the abutting state determination is performed that determines whether or not the number of times n is equal to or more than the defined value n1. If it is determined that there is an abutting state (namely, the shift shaft 70 has reached the actual mechanical maximum rotation angle), then the processing shifts to the engagement process of the shift clutch 37. In this manner, in this embodiment, even if the actual mechanical maximum rotation angles θMAX(up), θMAX(down) deviate from the above-described design values due to design error, assembly error and the like (including normal manufacturing variations) of the structural members of the clutch transmission mechanism 270 (FIG. 3), engagement of the shift clutch 37 is started by reverse rotation of the shift shaft 70 when the rotation angle of the shift shaft 70 reaches the actual mechanical maximum rotation angle. As a result, regardless of whether or not there are any design errors or assembly errors (including normal manufacturing variations), gear change shift can be performed reliably.

In addition, in this embodiment, the angle change amount p when the rotation angle θ of the shift shaft 70 is equal to or more than the defined value a or b is used as a basis for determining the abutting state. As a result, it is possible to more accurately determine that the rotation angle of the shift shaft 70 has reached the mechanical maximum rotation angle.

Moreover, in the motorcycle 10 according to the illustrated embodiment, the target achievement determination is performed that determines whether or not the rotation angle θ of the shift shaft 70 is equal to or more than target angle θmax (up) or θmax(down) for equal to or more than the defined time period t2. In addition, in this target achievement determination, when it is determined that the target angle has been reached, the processing shifts to the engagement process of the shift clutch 37. In this manner, in this embodiment, even if the actual mechanical maximum rotation angles θMAX(up), θMAX(down) deviate from the design values due to design error, assembly error and the like (including normal manufacturing variations) of the structural members of the clutch transmission mechanism 270, engagement of the shift clutch 37 is started by reverse rotation of the shift shaft 70 when the rotation angle of the shift shaft 70 has definitely exceeded the target angle. As a result, regardless of whether or not there are any design errors or assembly errors (including normal manufacturing variations), a gear change shift can be performed reliably.

Note that, this embodiment may adopt a configuration in which, if a defined wait time elapses without either one of the abutting state determination (FIG. 10, block S310) or the target achievement determination (block S330) being satisfied, it is determined that an abnormality of the rotation angle sensor 106 or the like has occurred, and the processing shifts to the engagement process of the shift clutch 37 without the determinations being satisfied. In addition, the embodiment may also be configured such that, in the case that the processing shifts to the engagement process of the shift clutch 37 based on the determination that an abnormality has occurred, a determined abnormality warning is issued. The method used for this abnormality warning is not particularly limited. For example, it is possible to use a method in which a display that indicates the occurrence of the abnormality is displayed on an indicator (a display device) or a method in which a warning lamp lights or flashes.

Second Embodiment

In the above-described first embodiment, when either one of the two determinations, namely, the abutting state determination (FIG. 10, block S310) and the target achievement determination (FIG. 10, block S330), is satisfied, engagement of the shift clutch 37 is started. In contrast, in a second embodiment described below, instead of the above-described target achievement determination, a gear change determination is performed in which it is determined whether or not the gear change is completed. Moreover, when either one of the two determinations, namely, the abutting state determination and the gear change determination is satisfied, the engagement of the shift clutch 37 is started.

Figure 12:
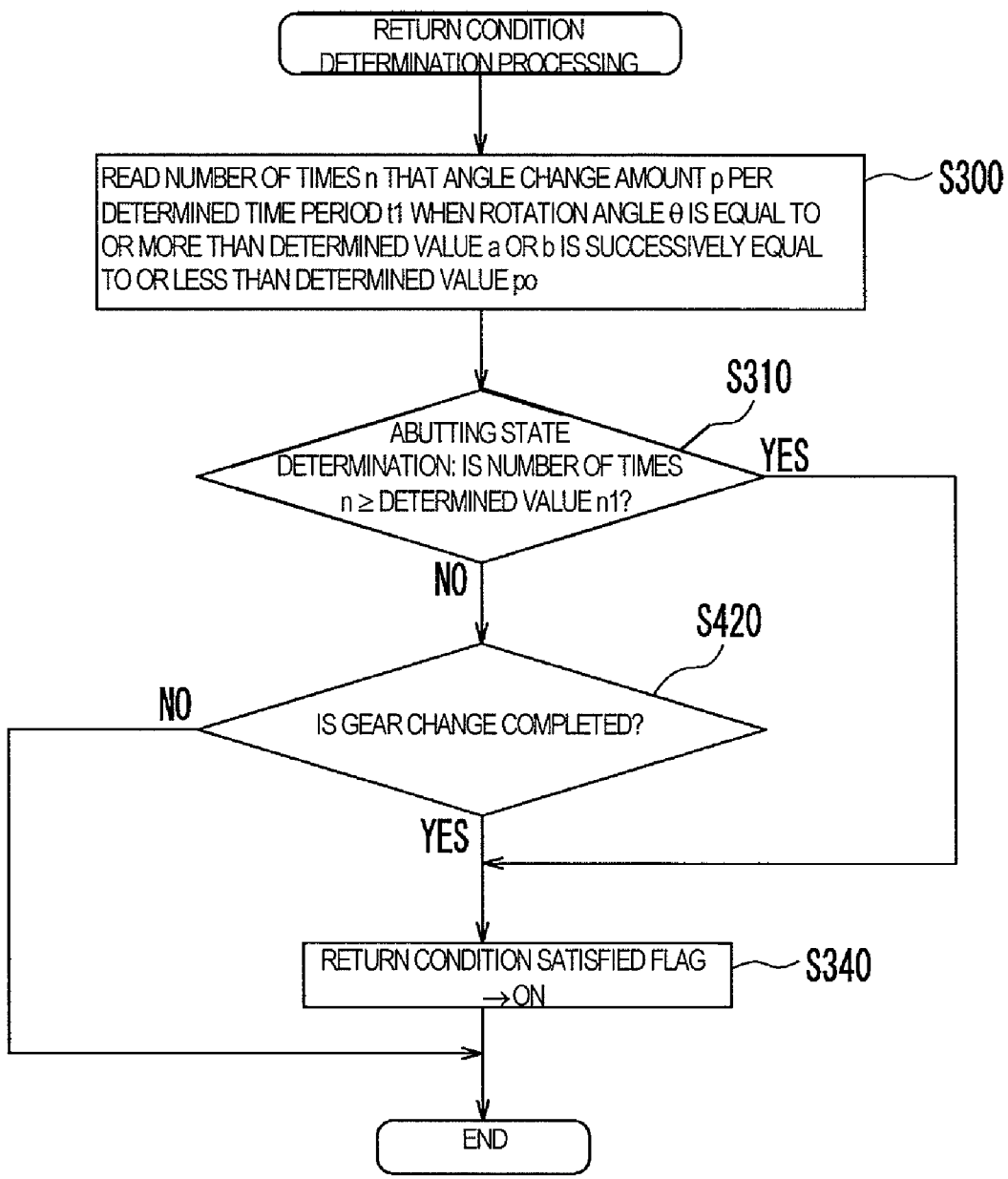
FIG. 12 is a flow chart showing a preferred return condition determination process in accordance with a second embodiment.

FIG. 12 is a flow chart showing the flow of return condition determination processing according to the second embodiment. In the return condition determination processing shown in FIG. 12, processes that are the same as those of the return condition determination processing of FIG. 10 are denoted with the same reference numerals. An explanation of these processes is omitted here. In addition, in the motorcycle according to the second embodiment, the processes other than those shown in FIG. 12, the structural members and the devices etc. are the same as, or substantially similar to, those in the motorcycle 10 according to the first embodiment. Accordingly, an explanation of these details is omitted here.

In the return condition determination processing shown in FIG. 12, instead of the processing of blocks S320, S330 in the return condition determination processing shown in FIG. 10, the processing of block S420 is performed. In block S420, the ECU 100 determines whether or not the gear change is completed. In this processing, the ECU 100 determines whether or not the gear change of the speed change device 38 is completed based on the detection result of the gear position sensor 103. During performance of the processing of block S420, the ECU 100 functions as a third determination device of the invention in the illustrated arrangement. If it is determined that the gear change is completed at block S420, the processing proceeds to the processing of block S340. On the other hand, if it is determined that the gear change is not completed, the return condition determination processing is ended. At this time, the return condition satisfied flag is not set to ON, and is held at OFF.

As explained above, in the second embodiment, when either one of the two determinations, namely, the abutting state determination (block S310) or the gear change determination (block S420), is satisfied, engagement of the shift clutch 37 is started. Accordingly, in this embodiment, if it is determined that the gear change is completed prior to when the rotation angle of the shift shaft 70 has reached the actual mechanical maximum rotation angles θMAX(up), θMAX (down), engagement of the shift clutch 37 is started. As a result, it is possible to shorten the time it takes to perform gear change shift. In addition, as in the first embodiment, gear change shift can be performed reliably regardless of whether or not there are any design errors or assembly errors (including normal manufacturing variations) of the structural members of the clutch transmission mechanism 270.

Note that, this embodiment may adopt a configuration in which, if a defined wait time elapses without either one of the abutting state determination (FIG. 12, block S310) or the gear change determination (block S420) being satisfied, it is determined that an abnormality of the rotation angle sensor 106 or the like has occurred, and the processing shifts to the engagement process of the shift clutch 37 without the determinations being satisfied. In addition, the embodiment may also be configured such that, in the case that the processing shifts to the engagement process of the shift clutch 37 based on the determination that an abnormality has occurred, a abnormality warning is issued. The method used for this abnormality warning is not particularly limited. For example, it is possible to use a method in which a display that indicates the occurrence of the abnormality is displayed on an indicator (a display device) or a method in which a warning lamp lights or flashes.

Third Embodiment

In a third embodiment described herein below, only the abutting state determination is performed in the return condition determination processing. In addition, when the abutting state determination is satisfied, engagement of the shift clutch 37 is started.

Figure 13:
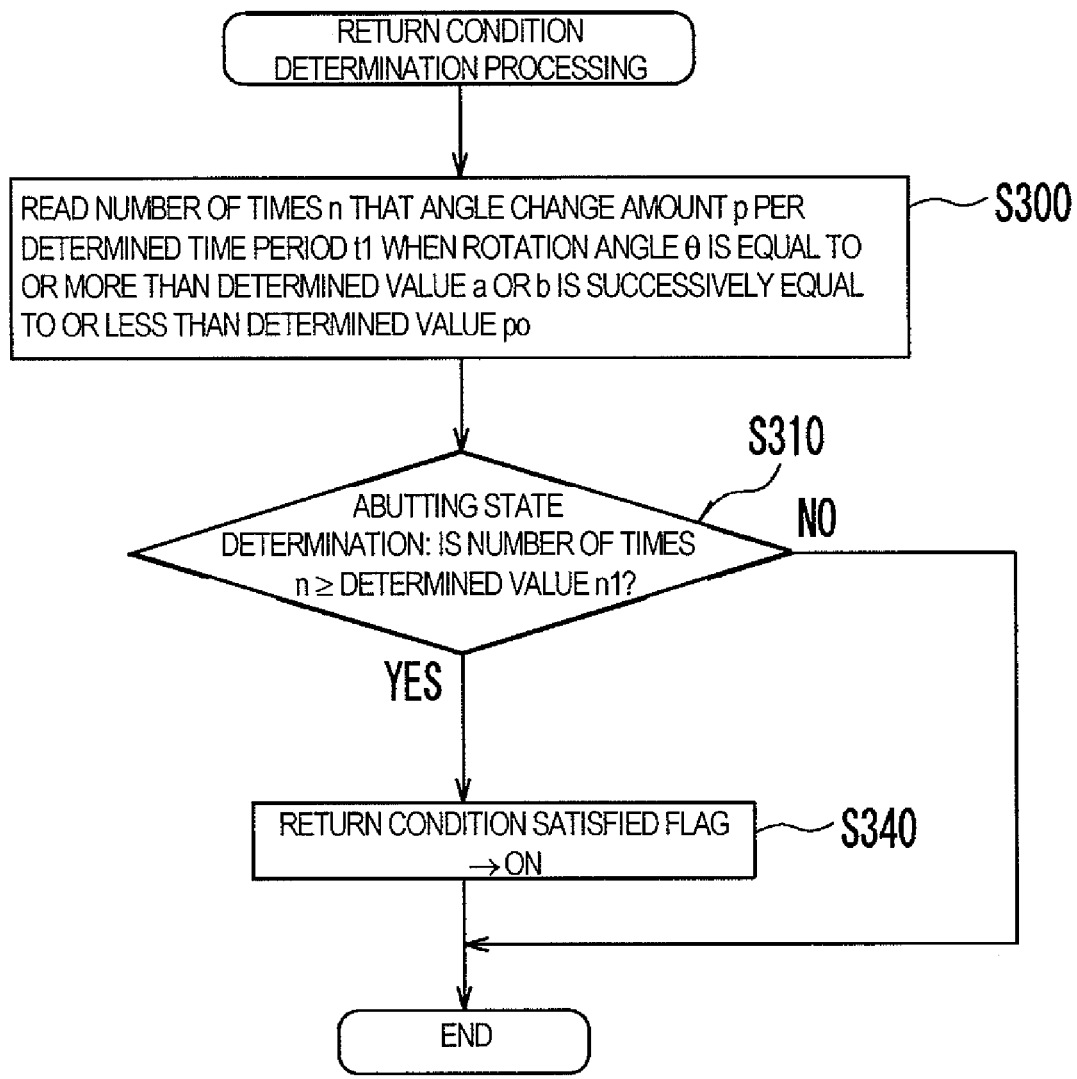
FIG. 13 is a flow chart showing a preferred return condition determination process in accordance with a third embodiment.

FIG. 13 is a flow chart showing the flow of return condition determination processing according to the third embodiment. In the return condition determination processing shown in FIG. 13, processes that are the same as, or substantially similar to, those in the return condition determination processing shown in FIG. 10 are denoted with the same reference numerals. In addition, in the motorcycle according to the third embodiment, the processes other than those shown in FIG. 13, the structural members and the devices etc. are the same as, or similar to, those in the motorcycle 10 according to the first embodiment. Accordingly, an explanation of these details is omitted.

In the return condition determination processing shown in FIG. 13, in the abutting state determination of block S310, if the number of times n is equal to or more than the defined value n1, the processing proceeds to the processing of block S340. On the other hand, if the number of times n in block S310 is not equal to or more than the defined value n1, the return condition determination processing is ended.

As described above, in the third embodiment, engagement of the shift clutch 37 is started when the abutting state determination (block S310) is satisfied. As a result, even if the actual mechanical maximum rotation angles θMAX(up), θMAX(down) deviate from the design values due to design error, assembly error and the like (including normal manufacturing variations) of the structural members of the clutch transmission mechanism 270, engagement of the shift clutch 37 is started by reverse rotating the shift shaft 70 when the rotation angle of the shift shaft 70 reaches the actual mechanical maximum rotation angle. As a result, regardless of whether or not there are any design errors or assembly errors (including normal manufacturing variations), a gear change shift can be performed reliably.

Note that, this embodiment may adopt a configuration in which, if a defined wait time elapses without the abutting state determination (FIG. 13, block S310) being satisfied, it is determined that an abnormality of the rotation angle sensor 106 or the like has occurred, and the processing shifts to the engagement process of the shift clutch 37 without the determination being satisfied. In addition, the embodiment may also be configured such that, in the case that the processing shifts to the engagement process of the shift clutch 37 based on the determination that an abnormality has occurred, a determined abnormality warning is issued. The method used for this abnormality warning is not particularly limited. For example, it is possible to use a method in which a display that indicates the occurrence of the abnormality is displayed on an indicator (a display device) or a method in which a warning lamp lights or flashes.

Fourth Embodiment

In the above-described first to third embodiments, if it is determined that the rotation of the shift shaft 70 is being regulated throughout the defined time period, it is determined that the rotation angle of the shift shaft 70 has reached the mechanical maximum rotation angle. However, the rotation of the shift shaft 70 is regulated not only when the rotation angle of the shift shaft 70 reaches the mechanical maximum rotation angle, but also when the above-described gear clash occurs. In a fourth embodiment described below, a clash determination device (a fourth determination device) is provided. If the rotation of the shift shaft 70 is regulated, the clash determination device determines whether the regulation is caused by the shift shaft 70 abutting against the stopper 280*a* or stopper 280*b* (namely, reaching the mechanical maximum rotation angle) or by the occurrence of clash. In addition, if it is determined that the regulation is caused by clash, control is performed to end the clashing state.

Figure 14:
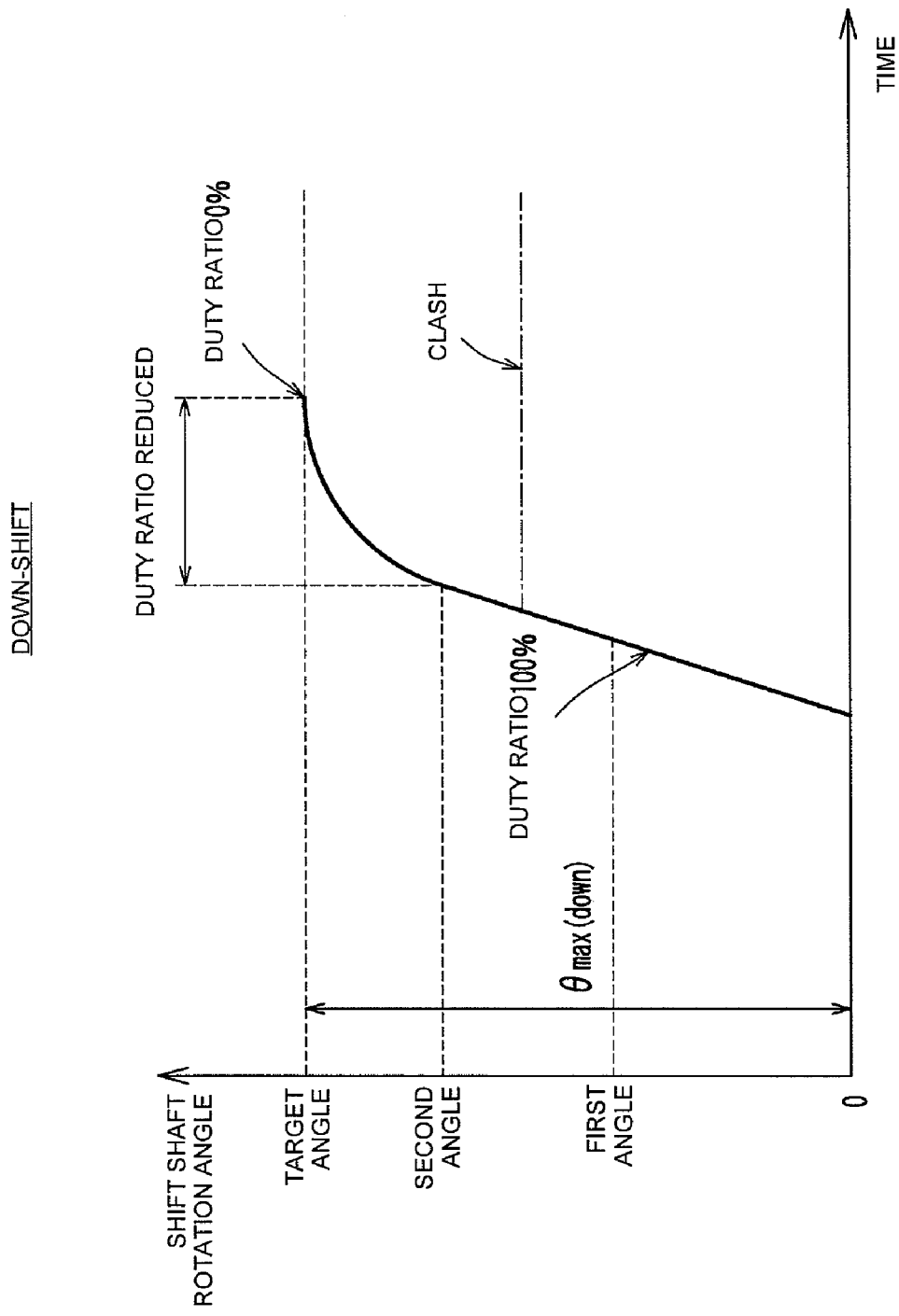
FIG. 14 is a graph that shows the transition in a rotation angle over time in an engagement process of a shift clutch.

FIG. 14 shows the transition in the rotation speed of the shift shaft 70 over time in the engagement process of the shift clutch 37. Note that, FIG. 14 just illustrates the case of a downshift. As described above, the ECU 100 performs PWM control of the electric motor provided in the actuator 75 (FIG. 3). In the PWM control, the duty ratio (the ratio of the energized time per unit time) of the drive voltage of the electric motor is changed to determine the rotation speed of the electric motor. More specifically, in the PWM control, the duty ratio is changed to change the rotation speed (rotational driving force) of the shift shaft 70. For example, if the duty ratio is 0%, the rotation speed of the shift shaft 70 is zero, and if the duty ratio is 100%, the rotational speed of the shift shaft 70 is the maximum rotational speed.

As shown in FIG. 14, in this embodiment, in the engagement process of the shift clutch 37, the duty ratio is set high (in FIG. 14, the duty ratio is 100%) from when the shift shaft 70 starts to rotate until when the rotation angle of the shift shaft 70 approaches close to the target angle θmax(down). Then, the duty ratio is reduced from when the rotation angle of the shift shaft 70 approaches close to the target angle θmax (down) to when the target angle θmax(down) is reached. As a result, the rotation speed of the shift shaft 70 reduces. In addition, when the target angle is reached, the duty ratio is set to 0%, and rotation of the shift shaft 70 stops.

Note that, in the case that the shift shaft 70 is abutting against the stopper 280*a* or 280*b*, the shift shaft 70 will abut in the region in the vicinity of the target angle. As a result, the duty ratio when the shift shaft 70 abuts will be small. On the other hand, as shown by the dot-dash line in FIG. 14, if clash occurs at a rotation angle between the reference angle (0°) and the target angle θmax(down), the shift shaft 70 will abut when the duty ratio is high. In this embodiment, this difference in the duty ratio when the shift shaft 70 abuts is used as a basis for determining whether the shift shaft 70 has reached the mechanical maximum rotation angle or clash has occurred.

Figure 15:
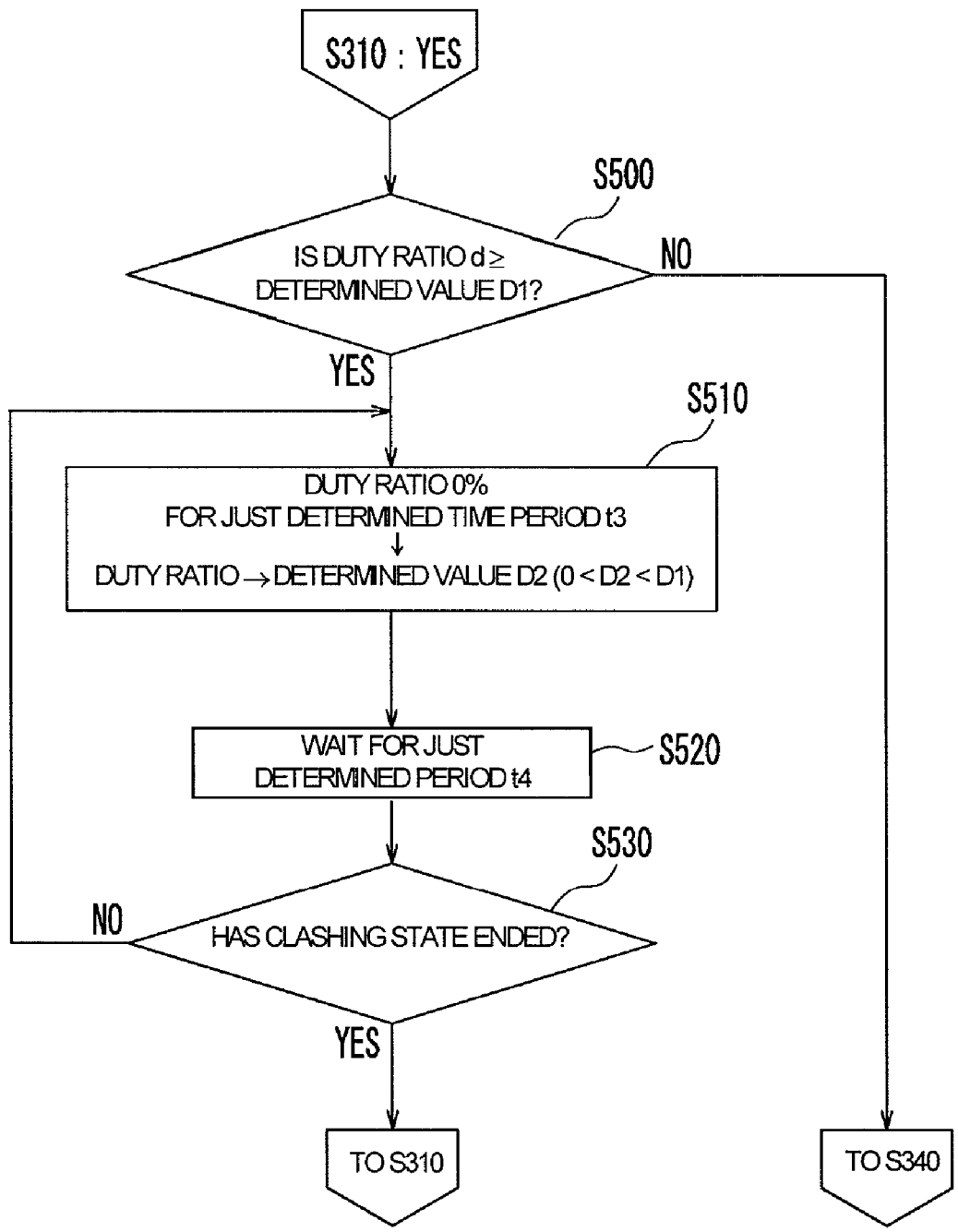
FIG. 15 is a flow chart showing a preferred flow of a clash determination process in accordance with a fourth embodiment.

FIG. 15 is a flow chart that shows the flow of clash determination processing according to the fourth embodiment. The clash determination processing is a process that starts when it is determined that the shift shaft 70 is abutting in the abutting state determination of the processing of block S310 (FIG. 10, FIG. 12, and FIG. 13) (YES in S310). Note that, in the motorcycle according to the fourth embodiment, processes other than those shown in FIG. 15, the structural members and the devices etc. are the same as those in the motorcycles according to the first, second and third embodiments. Accordingly, an explanation of these details is omitted.

When the clash determination processing starts, first, at block S500, it is determined whether or not a duty ratio d is equal to or more than a defined value D1. In this processing, if it is determined that the duty ratio is high (equal to or more than the defined value D1), it is determined that clash has occurred. On the other hand, if the duty ratio is low (less than the defined value D1), it is determined that clash has not occurred. In this case, since it is determined that the shift shaft 70 is abutting at block S310, it can be determined that the abutting state of the shift shaft 70 is not caused by clash, but is caused by the shift shaft 70 abutting against the stopper 280*a* or the stopper 280*b*.

In the case that it is determined at block S500 that the duty ratio is not equal to or more than the defined value D1 (ie, is less than D1), it can be determined that the shift shaft 70 has reached the mechanical maximum rotation angle, and thus the ECU 100 proceeds to the processing of block S340 (refer to FIG. 10, FIG. 12, and FIG. 13).

On the other hand, if it is determined that the duty ratio is equal to or more than the defined value D1 at block S500, it can be determined that clash has occurred, and thus the ECU 100 proceeds to the processing of block S510 that relates to ending the clashing state. At block S510, the ECU 100 first sets a duty ratio of 0% for just a defined time period t3. As a result of this processing, the rotational driving force of the shift shaft 70 becomes substantially zero. As a result, the force pushing the first gear 46*a* to the second gear 46*b* (FIG. 5) becomes substantially zero. When the pushing force applied to the second gear 46*b* becomes substantially zero, the engine driving force transmitted to the main shaft 44 and the drive shaft 45 (FIG. 2) causes the first gear 46*a* and the second gear 46*b* to rotate relative to each other.

After the duty ratio has been set to 0% for the defined time period t3 at block S510, the ECU 100 sets the duty ratio to a defined value D2 (0<D2<D1). As a result, the pushing force on the second gear 46*b* is generated once again. Accordingly, in the processing of block S510, after the first gear 46*a* and the second gear 46*b* have been rotated relative to each other, the first gear 46*a* is pressed toward the second gear 46*b* in this manner. As a result, the clashing state can be ended easily.

Following the processing of block S510, next, in block S520, the processing waits a defined time period t4. In this processing, the ECU 100 waits the defined time period t4 with the duty ratio held set at the defined value D2 as a result of the processing of block S510.

Following the processing of block S520, next, at block S530, it is determined whether the clashing state has ended. The method used for determining whether the clashing state has ended is not particularly limited. For example, the method described below may be used. First, as one example, a method in which it is determined whether or not gear change is completed may be used. More specifically, in the case that it is determined that the gear change of the speed gear 47 is completed based on the detection result of the gear position sensor 103, it can be determined that the clashing state has ended. Alternatively, it is possible to use another method that utilizes the abutting state determination. As an example of such a method using the abutting state determination, for example, a method may be used in which the angle change amount of the shift shaft 70 per a defined time period is calculated, and then it is determined whether or not the number of times when the angle change amount has become tiny (or zero) has continued for a defined number of times.

At block S530, if it is determined that the clashing state has ended, the ECU 100 returns to the processing of block S310 (FIG. 10, FIG. 12, and FIG. 13). On the other hand, if it is determined that the clashing state has not ended at block S530, the ECU 100 returns to the processing of block S510. Then, as a result of the processing of blocks S510, S520, the processing related to ending the clashing state is performed again.

As described above, in the fourth embodiment, when the shift shaft 70 is in the abutting state, it is determined whether or not the abutting state is caused by the shift shaft 70 reaching the mechanical maximum rotation angle or by the occurrence of clash. In addition, in the case that it is determined that there is a clashing state, processing is performed that ends the clashing state. As a result, it is possible to perform gear change shift even more reliably.

Other Embodiments

The first to fourth embodiments may be appropriately combined to carry out the invention. The shift control device according to the present invention may include the first determination device, the second determination device and the third determination device. In addition, during the disengagement process of the shift clutch 37, when it is determined that the determinations of the first determination device, the second determination device and the third determination device are satisfied, the processing may shift to the engagement process of the shift clutch 37. In addition, if none of the determinations of the first determination device, the second determination device and the third determination device are satisfied between the time when the disengagement process of the shift clutch 37 is started and when the defined time period elapses, the processing may shift to the engagement process of the shift clutch 37.

A configuration may also be adopted in which, when the determination of the first determination device is satisfied and the rotation angle of the shift shaft 70 is equal to or more than a first angle and less than a second angle (which is > the first angle) during the disengagement process of the shift clutch 37 (FIG. 14), the fourth determination device determines that clash has occurred.

In addition, a configuration may also be adopted in which, when the determination of the first determination device is satisfied, the rotation angle of the shift shaft 70 is equal to or more than the first angle and less than the second angle, and the determination of the third determination device is not satisfied during the disengagement process of the shift clutch 37, the fourth determination device determines that clash has occurred.

As described above, the invention can be favorably used for a shift control device and a vehicle incorporating a shift control device.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present shift control device has been described in the context of particularly preferred embodiments, the skilled artisan will appreciate, in view of the present disclosure, that certain advantages, features and aspects of the shift control device may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;
a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle;
at least a first determination device that performs an abutting state determination that determines whether the rotation angle of the shift shaft has reached the mechanical maximum rotation angle; and
a rotation angle detection device that detects the rotation angle of the shift shaft, wherein the first determination device performs the abutting state determination based on a detection result of the rotation angle detection device; wherein
the first determination device performs the abutting state determination based on a change amount of the rotation angle of the shift shaft per a defined period of time; and
the first determination device determines that there is an abutting state when the change amount of the rotation angle of the shift shaft per the defined period of time is successively equal to or below a threshold value for a threshold number of times.

2. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;
a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle; and
at least a first determination device that performs an abutting state determination that determines whether the rotation angle of the shift shaft has reached the mechanical maximum rotation angle; wherein
a rotation direction of the shift shaft during a clutch disengagement process is the opposite direction from the rotation direction of the shift shaft during a clutch engagement process, and the control device initiates the clutch engagement process when the abutting state determination of the first determination device is satisfied during the clutch disengagement process.

3. The shift control device of claim 2, wherein the first determination device determines that there is an abutting state when the rotation angle of the shift shaft is equal to or more than a threshold value.

4. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;
a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle; and
at least a first determination device that performs an abutting state determination that determines whether the rotation angle of the shift shaft has reached the mechanical maximum rotation angle; wherein
a rotation direction of the shift shaft during a clutch disengagement process is the opposite direction from the rotation direction of the shift shaft during a clutch engagement process, and the control device initiates the clutch engagement process when the abutting state determination of the first determination device is not satisfied during the time from when the clutch disengagement process is started until a defined wait time period elapses.

5. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;
a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle;
at least a first determination device that performs an abutting state determination that determines whether the rotation angle of the shift shaft has reached the mechanical maximum rotation angle;
a rotation angle detection device that detects the rotation angle of the shift shaft; and
a second determination device that determines whether the rotation angle of the shift shaft has reached a target angle based on a detection result of the rotation angle detection device.

6. The shift control device of claim 5, wherein the second determination device determines that the rotation angle of the shift shaft has reached the target angle when the rotation angle detected by the rotation angle detection device has become equal to or greater than the target angle for a time period that is equal to or greater than a defined time period.

7. The shift control device of claim 5, wherein a rotation direction of the shift shaft during a clutch disengagement process is the opposite direction from a rotation direction of the shift shaft during a clutch engagement process, and the control device initiates the clutch engagement process when at least one of the abutting state determination of the first determination device and the target angle determination of the second determination device is satisfied during the clutch disengagement process.

8. The shift control device of claim 5, wherein a rotation direction of the shift shaft during a clutch disengagement process is the opposite direction from a rotation direction of the shift shaft during a clutch engagement process, and the control device initiates the clutch engagement process when the abutting state determination of the first determination device and the target angle determination of the second determination device are not satisfied during the time from when the clutch disengagement process is started until a defined wait time period elapses.

9. The shift control device of claim 8, wherein an abnormality warning is issued when the clutch engagement process is initiated after the defined wait time period.

10. The shift control device of claim 5, further comprising:
a gear position detection device that detects a gear position of the speed gears; and
a third determination device that determines whether a gear change is completed based on a detection result of the gear position detection device.

11. The shift control device of claim 10, wherein a rotation direction of the shift shaft during a clutch disengagement process is the opposite direction from the rotation direction of the shift shaft during a clutch engagement process, and the control device initiates the clutch engagement process when at least one of the abutting state determination of the first determination device, the target angle determination of the second determination device and the gear change completion determination of the third determination device is satisfied during the clutch disengagement process.

12. The shift control device of claim 10, wherein a rotation direction of the shift shaft during a clutch disengagement process is the opposite direction from the rotation direction of the shift shaft during a clutch engagement process, and the control device initiates the clutch engagement process when the abutting state determination of the first determination device, the target angle determination of the second determination device and the gear change completion determination of the third determination device are not satisfied during the time from when the clutch disengagement process is started until a defined wait time period elapses.

13. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;
a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle;
at least a first determination device that performs an abutting state determination that determines whether the rotation angle of the shift shaft has reached the mechanical maximum rotation angle;
a gear position detection device that detects a gear position of the speed gears; and a third determination device that determines whether a gear change is completed based on a detection result of the gear position detection device; wherein a rotation direction of the shift shaft during a clutch disengagement process is the opposite direction from a rotation direction of the shift shaft during a clutch engagement process, and the control device initiates the clutch engagement process when at least one of the abutting state determination of the first determination device and the gear change completion determination of the third determination device is satisfied during the clutch disengagement process.

14. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;
a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle;
at least a first determination device that performs an abutting state determination that determines whether the rotation angle of the shift shaft has reached the mechanical maximum rotation angle;
a gear position detection device that detects a gear position of the speed gears; and
a third determination device that determines whether a gear change is completed based on a detection result of the gear position detection device; wherein a rotation direction of the shift shaft during a clutch disengagement process is the opposite direction from a rotation direction of the shift shaft during a clutch engagement process, and the control device initiates the clutch engagement process when the abutting state determination of the first determination device and the gear change completion determination of the third determination device are not satisfied during the time from when the clutch disengagement process is started until a defined wait time period elapses.

15. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;
a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle; and
at least a first determination device that performs an abutting state determination that determines whether the rotation angle of the shift shaft has reached the mechanical maximum rotation angle; wherein
the speed change device is a dog clutch transmission that includes a plurality of first gears formed with engagement protrusions, and a plurality of second gears formed with engagement grooves that receive the engagement protrusions, the dog clutch transmission performs a gear change by engaging the engagement protrusions of one of the first gears with a portion of the engagement grooves of one of the second gears to rotationally couple the one first gear and the one second gear, and the shift control device further comprises a fourth determination device that determines whether the one first gear and the one second gear have not coupled and a clash has occurred; and
the fourth determination device determines whether a clash has occurred based on a rotation speed of the shift shaft.

16. The shift control device of claim 15, wherein a drive speed of the actuator is determined by a duty ratio of a drive control of the actuator, and the fourth determination device determines whether a clash has occurred based on the duty ratio of the drive control.

17. The shift control device of claim 16, wherein the fourth determination device determines that a clash has occurred when the duty ratio is equal to or above a threshold value.

18. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;
a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle; and
at least a first determination device that performs an abutting state determination that determines whether the rotation angle of the shift shaft has reached the mechanical maximum rotation angle; wherein
the speed change device is a dog clutch transmission that includes a plurality of first gears formed with engagement protrusions, and a plurality of second gears formed with engagement grooves that receive the engagement protrusions, the dog clutch transmission performs a gear change by engaging the engagement protrusions of one of the first gears with a portion of the engagement grooves of one of the second gears to rotationally couple the one first gear and the one second gear, and the shift control device further comprises a fourth determination device that determines whether the one first gear and the one second gear have not coupled and a clash has occurred; and
when the fourth determination device determines that a clash has occurred, a gear change assist control is performed in which a rotational driving force of the shift shaft is reduced for a defined time period, and then the rotational driving force of the shift shaft is increased.

19. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;

a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle; and
at least a first determination device that performs an abutting state determination that determines whether the rotation angle of the shift shaft has reached the mechanical maximum rotation angle; wherein
the speed change device is a dog clutch transmission that includes a plurality of first gears formed with engagement protrusions, and a plurality of second gears formed with engagement grooves that receive the engagement protrusions, the dog clutch transmission performs gear change by engaging the engagement protrusions of one of the first gears with a portion of the engagement grooves of one of the second gears to rotationally couple the one first gear and the one second gear, and the shift control device further comprises a fourth determination device that determines whether the first gears and the second gears have not coupled and are clashing, wherein the fourth determination device determines that a clash has occurred when, during the clutch disengagement process, the abutting state determination of the first determination device is satisfied, and the rotation angle of the shift shaft is equal to or greater than a first angle and less than a second angle.

20. A shift control device, comprising:
a clutch;
a speed change device having a plurality of speed gear ratios;
an actuator;
a shift shaft that is rotated by the actuator;
a clutch transmission mechanism that engages and disengages the clutch in response to rotation of the shift shaft;
a speed change device transmission mechanism that switches the speed gear ratio in response to rotation of the shift shaft;
a control device that controls the actuator;
a stop that regulates rotation of the shift shaft such that a rotation angle of the shift shaft does not exceed a mechanical maximum rotation angle; and
at least a first determination device that performs an abutting state determination that determines whether the rotation angle of the shift shaft has reached the mechanical maximum rotation angle; wherein
the speed change device is a dog clutch transmission that includes a plurality of first gears formed with engagement protrusions, and a plurality of second gears formed with engagement grooves that receive the engagement protrusions, the dog clutch transmission performs a gear change by engaging the engagement protrusions of one of the first gears with a portion of the engagement grooves of one of the second gears to rotationally couple the one first gear and the one second gear, and the shift control device further comprises:
a rotation angle detection device that detects the rotation angle of the shift shaft;
a gear position detection device that detects a gear position of the speed gears;
a third determination device that determines whether gear change is completed based on a detection result of the gear position detection device; and
a fourth determination device that determines whether the first gears and the second gears have not coupled and are clashing;
wherein the fourth determination device determines that a clash has occurred when, during the clutch disengagement process, the abutting state determination of the first determination device is satisfied, the rotation angle of the shift shaft is equal to or greater than a first angle and less than a second angle, and the gear change completion determination of the third determination device is not satisfied.

* * * * *